US006536207B1

(12) United States Patent
Kamen et al.

(10) Patent No.: US 6,536,207 B1
(45) Date of Patent: Mar. 25, 2003

(54) AUXILIARY POWER UNIT

(75) Inventors: Dean L. Kamen, Bedford, NH (US); Christopher C. Langenfeld, Nashua, NH (US); Michael Norris, Manchester, NH (US); Jason Michael Sachs, Hooksett, NH (US)

(73) Assignee: New Power Concepts LLC, Manchester, NH (US)

( * ) Notice: Subject to any disclaimer, the term of this patent is extended or adjusted under 35 U.S.C. 154(b) by 0 days.

(21) Appl. No.: 09/517,808

(22) Filed: Mar. 2, 2000

(51) Int. Cl.$^7$ ................................................. F02C 5/00
(52) U.S. Cl. ............................. 60/39.6; 60/517; 60/524
(58) Field of Search ........................... 60/517, 524, 645, 60/670, 641.1, 641.8, 39.6

(56) References Cited

U.S. PATENT DOCUMENTS

| | | | |
|---|---|---|---|
| 3,940,933 A | 3/1976 | Nyström | 60/522 |
| 4,020,635 A | 5/1977 | Joynes et al. | 60/525 |
| 4,067,191 A | 1/1978 | Gronvall et al. | 60/39.27 |
| 4,313,080 A | 1/1982 | Park | 320/61 |
| 4,384,457 A | 5/1983 | Harvey | 60/524 |
| 4,413,475 A * | 11/1983 | Moscrip | 60/521 |
| 4,434,617 A | 3/1984 | Walsh | 60/520 |
| 4,511,805 A | 4/1985 | Boy-Marcotte et al. | 290/2 |
| 4,633,667 A * | 1/1987 | Watanabe et al. | 60/525 |
| 4,824,149 A | 4/1989 | Reuchlein | 290/1 R |
| 4,996,841 A | 3/1991 | Meijer et al. | 60/525 |
| 5,065,579 A | 11/1991 | Monahan | 60/524 |
| 5,074,114 A | 12/1991 | Meijer et al. | 60/517 |
| 5,095,701 A | 3/1992 | Nakano | 60/521 |
| 5,148,066 A | 9/1992 | Beale et al. | 310/17 |
| 5,174,117 A | 12/1992 | Naito et al. | 60/520 |
| 5,203,170 A | 4/1993 | Naito | 60/524 |
| 5,228,293 A * | 7/1993 | Vitale | 60/641.1 |
| 5,441,401 A * | 8/1995 | Yamaguro et al. | 431/4 |
| 5,596,262 A | 1/1997 | Boll | 320/48 |

(List continued on next page.)

FOREIGN PATENT DOCUMENTS

| | | |
|---|---|---|
| DE | 35 00 124 A1 | 7/1986 |
| DE | 43 08 888 A1 | 9/1994 |
| EP | 0 458 115 A1 | 11/1991 |
| EP | 0 607 154 B1 | 7/1992 |
| GB | 1 528 714 A | 10/1974 |
| WO | WO 90/08891 | 8/1990 |
| WO | WO 99/40310 | 8/1999 |

OTHER PUBLICATIONS

Wiegman, et al., "Battery State Control Techniques for Charges Sustaining Applications," SAE International Congress and Exposition, Detroit, MI, Feb. 23–26, 1998, Paper No. 981129.

Hochgraf, et al., "Engine Control Strategy for a Series Hybrid Electric Vehicle Incorporating Load–Leveling and Computer Controlled Energy Management," SAE International Congress and Exposition, Detroit, MI, Feb. 26–29, 1996, Paper No. 960230.

(List continued on next page.)

Primary Examiner—Hoang Nguyen
(74) Attorney, Agent, or Firm—Bromberg & Sunstein LLP

(57) ABSTRACT

An auxiliary power system for providing electrical power and heat to an indoor area includes an external combustion engine, such as a Stirling cycle engine, for generating mechanical energy and thermal energy. The external combustion engine burns a fuel with substantially complete combustion such that exhaust emissions from the external combustion engine are below a predetermined exhaust level. A generator is coupled to the external combustion engine and converts the mechanical energy produced by the external combustion engine to electrical power. A first power output is used to provide the electrical power produced by the generator. The external combustion engine and generator are disposed within a housing such that the external combustion engine, generator and housing combination is a portable size. The thermal energy generated by the external combustion engine may be used to heat the atmosphere surrounding the housing.

32 Claims, 19 Drawing Sheets

U.S. PATENT DOCUMENTS

| | | | |
|---|---|---|---|
| 5,735,681 A | | 4/1998 | Cheng ........................ 431/10 |
| 5,755,100 A | | 5/1998 | Lamos ........................ 60/521 |
| 5,786,640 A | | 7/1998 | Sakai et al. .................... 290/17 |
| 5,804,947 A | | 9/1998 | Nii et al. ...................... 322/16 |
| 5,864,770 A | | 1/1999 | Ziph et al. .................. 701/110 |
| 5,875,863 A | | 3/1999 | Jarvis et al. ............... 180/64.4 |
| 5,920,133 A | | 7/1999 | Penswick et al. ............. 310/17 |
| 5,929,538 A | | 7/1999 | O'Sullivan et al. ........... 307/66 |
| 5,945,808 A | | 8/1999 | Kikuchi et al. ............. 320/132 |
| 5,952,813 A | | 9/1999 | Ochiai ........................ 320/104 |
| 6,050,092 A | | 4/2000 | Genstler et al. ............. 60/520 |
| 6,062,023 A | * | 5/2000 | Kerwin et al. ................ 60/520 |

OTHER PUBLICATIONS

Fleming, et al., "Rapid Recharge Capability of Valve Regulated Lead Acid Batteries for EV & HEV Applications," *Journal of Power Sources*, vol. 78 (1999), pp. 237–243.

Anderson, et al., "The Effects of APU Characteristics on the Design of Hybrid Control Strategies for Hybrid Electric Vehicles," SAE International Congress and Exposition , Detroit, MI, Feb. 27–Mar. 2, 1995, Paper No. 950493.

Oman, H., "New Energy Management Technology Gives Hybrid Cars Long Battery Life,"SAE 34 Intersociety Energy Conversion Enginnering Conference, Vancouver, BC, August 2–5, 1999, Paper 1999–01–2468.

Hobbs, et al. "Development of Optimized Fast Charge Algorithms for Lead Acid Batteries," SAE International Congress and Exposition, Detroit, MI, Mar. 1–4, 1999, Paper 1999–01–1157.

Dickinson, et al., "Performance, Management and Testing Requirements for Hybrod Electric Vehicle Betteries,"SAE Future Transportation Technology Conference and Exposition, Costa Mesa, CA, Aug. 11–13, 1998, Paper 981905.

\* cited by examiner-

AUXILIARY POWER UNIT

TECHNICAL FIELD

The present invention pertains to auxiliary power units for the co-generation of heat and power for indoor use wherein the auxiliary power unit includes an external combustion engine and in particular, a Stirling cycle engine.

BACKGROUND OF THE INVENTION

An auxiliary power unit ("APU") consists of an engine and an electric generator. Thermal energy of a burning fuel is converted to mechanical energy in the engine of the APU and mechanical energy is converted to electrical energy in the generator of the APU. One advantage of an APU is that it is a portable size such that it can be easily transported and used in a remote location, such as a construction site, cell tower or cabin, that is not connected to the local power grid. APU's are also important for providing emergency backup power for businesses and homes during a power outage.

Small and portable APU's using an internal combustion engine are widely available. For example, a 350 W APU weighs as little as 20 lbs while a 1 kW APU weighs around 70 lbs. However, APU's which use an internal combustion engine cannot be used in a closed environment because of the toxic emissions generated by the internal combustion engine. Even if the exhaust fumes were vented to the outside air, the noise generated by the internal combustion engine makes it very unappealing to a user. The venting of the exhaust fumes also reduces the overall efficiency of the system by about 35% due to the loss of the thermal energy carried away by the exhaust gases. Internal combustion engines are further disadvantaged by their high maintenance costs and short lifetimes of the order of 100 operating hours.

Also known in the prior art are co-generation units and heat pumps which use external combustion engines, such as Stirling cycle engines. However, these co-generation units are typically quite large (and therefore not portable) as dictated by the size of the external combustion engine. In addition, the exhaust fumes must still be vented to the outside air. As discussed above, venting of the exhaust fumes reduces the overall efficiency of the system due to the loss of the thermal energy carried away by the exhaust gases and requires additional hardware.

One type of external combustion engine which may be used to power an APU is a Stirling cycle engine. A Stirling cycle engine produces both mechanical energy and heat energy. The history of Stirling cycle engines is described in detail in Walker, *Stirling Engines*, Oxford University Press (1980), herein incorporated by reference. The principle of operation of a Stirling engine is well known in the art.

One disadvantage of a Stirling cycle engine in comparison to an internal combustion engine is the longer response time of a Stirling cycle engine to sudden changes in the load placed on the engine. The response time of a Stirling cycle engine is limited by the heat transfer rates between the external combustion gases and the internal working fluid of the engine and may be on the order of 30 seconds. The response time of an internal combustion engine, on the other hand, is very short because the combustion gas is the working fluid and can be directly controlled by the fuel flow rate. Prior attempts to increase the responsiveness of a Stirling cycle engine provided a variable dead space for the working fluid as described in U.S. Pat. No. 3,940,933 to Nystrom and U.S. Pat. No. 4,996,841 to Meijer or controlled the pressure of the working fluid as described in U.S. Pat. No. 5,755,100 to Lamos. The foregoing references are hereby incorporated by reference in their entirety. However, both these approaches tend to increase the complexity, size, and weight of the engine design.

SUMMARY OF THE INVENTION

In accordance with one aspect of the invention, in one of its embodiments, a method for providing auxiliary electrical power and heat to an indoor area of a house includes generating mechanical energy and thermal energy using an external combustion engine, the external combustion engine burning a fuel and having substantially complete combustion and converting the mechanical energy generated by the external combustion engine into electrical power using a generator coupled to the external combustion engine. The external combustion engine and generator are placed in the indoor area such that the thermal energy generated by the external combustion engine heats an area surrounding the external combustion engine. The external combustion engine and generator may be contained within a portable housing. In a preferred embodiment, the external combustion engine is a Stirling cycle engine. In other embodiments, the fuel burned by the external combustion engine may be propane or natural gas. In accordance with another embodiment of the invention, the electrical power may direct current power or alternating current power.

In accordance with another aspect of the invention, in one of its embodiments, an auxiliary power system for providing electrical power and heat to an indoor area of a house includes an external combustion engine for generating mechanical energy and thermal energy, the external combustion engine burning a fuel and having substantially complete combustion and a generator, coupled to the external combustion engine, the generator for converting the mechanical energy of the external combustion engine to electrical power. The system further includes a first power output for providing electrical power and a portable housing containing the external combustion engine and the generator. The thermal energy generated by the external combustion engine heats the an area surrounding the portable housing. In a preferred embodiment, the external combustion engine is a Stirling cycle engine. The housing may also be mounted in a window or on a wall of the indoor area.

The auxiliary power system may further include a battery for providing starting power to the external combustion engine and for providing power to the first power output. A sensor is coupled to the battery to produce an output signal. The charge level of the battery may be determined based in part on the output signal of the sensor. In one embodiment, the output signal represents the battery voltage and current. In another embodiment, the auxiliary power system further includes an inverter coupled to the first power output for converting direct current power to alternating current power and a second power output for providing alternating current power. In yet another embodiment, the auxiliary power system further includes an air conditioning module for cooling the atmosphere surrounding the housing.

In accordance with yet another aspect of the present invention, a system for controlling the power output of a thermal engine having a heater head, includes a burner for delivering heat to the heater head of the engine and having an exhaust gas product, a fuel supply regulator for delivering fuel to a burner at a specified rate of fuel delivery and a blower for delivering air to the burner. In one embodiment, the system further includes an input for receiving a signal related to a specified temperature of operation of the burner, a sensor for monitoring an oxygen concentration in the exhaust gas product of the burner and a controller for governing the rate of fuel and air delivery based at least on the input related to the specified temperature of operation and the oxygen concentration in the exhaust gas product. The input for receiving a signal may include a slew rate limiter.

In another embodiment, the system for controlling the power output of a thermal engine further includes a head temperature sensor for measuring the temperature of the heater head and a controller for governing the rate of fuel and air delivery based at least on the temperature of the heater head. The system may further include a sensor for monitoring an oxygen concentration in the exhaust gas where the controller includes a controller based at least on the temperature of the heater had and the oxygen concentration in the exhaust gas product.

In a further embodiment, the head temperature sensor is disposed in a region of and exterior surface of the heater head shadowed from flow of the exhaust gas. The system may also include an air mass flow sensor for measuring the mass of air delivered to the burner where the controller for governing the rate of fuel and air delivery includes a controller based at least on the temperature of the heater head and the mass of air delivered to the burner.

In accordance with another embodiment of the invention, a system for controlling the power output of an external combustion engine having a crankshaft includes a generator for regulating the speed of the external combustion engine, an amplifier for transforming power form the generator to a power output and providing a load on the generator and a battery for storing power and providing power to a power output. The speed and temperature of the external combustion engine are controlled in a manner to maintain a set of desired battery conditions.

In accordance with yet another aspect of the invention, a method for operating the burner of an external combustion engine includes delivering air to the burner through a constant cross-sectional area in transition from a radial flow inward to an axial flow downward, delivering the air to the burner at a speed greater than the flame speed of a fuel-air mixture and stabilizing a flame produced in the burner using a swirler for conveying radially inwardly flowing air.

An auxiliary power system for providing electrical power to a load, in accordance with another aspect of the invention, includes an external combustion engine having an engine temperature and having a rotating crankshaft characterized by a velocity, a generator for regulating the velocity of the crankshaft and producing electrical power, an amplifier for transferring electrical power from the generator to a load, a battery having a charge state and a controller for commanding the engine temperature and velocity based in part on the charge state of the battery.

In accordance with a further embodiment of the invention, a system for providing power to a personal transport vehicle having a set of wheels including at least one member and a wheel motor coupled to the set of wheels for causing, when powered, locomotion of the personal transport vehicle includes an external combustion engine for generating mechanical energy and thermal energy, the external combustion engine burning a fuel in a burner and having substantially complete combustion such that the exhaust emissions from the external combustion engine are below a predetermined exhaust level. The system further includes a fuel supply for providing a fuel to the burner at a specified rate of fuel delivery, a generator for converting the mechanical energy produced by the external combustion engine to electrical power and a battery having an input and an output, the battery input coupled to the generator and the battery output coupled to the wheel motor, the battery for storing electrical energy provided from the generator at the battery input and for providing power to the wheel motor at the battery output.

A mobile auxiliary power unit, in accordance with a further embodiment of the invention, includes an external combustion engine having a crankshaft characterized by a velocity and a heater head characterize by a head temperature, the external combustion engine for generating mechanical energy and thermal energy, the external combustion engine burning a fuel and having substantially complete combustion such that exhaust emissions from the external combustion engine are below a predetermined exhaust level. A generator having an output, is coupled to the crankshaft of the external combustion engine and converts the mechanical energy produced by the external combustion engine into electrical power, the electrical power provided to the output of the generator. A battery having a battery output is coupled to the output of the generator. The battery characterized by a state of charge and provides starting power to the external combustion as well as power to the battery output. The mobile auxiliary power unit further includes a controller in signal communication with the external combustion engine, the generator and the battery. The controller governs the velocity of the crankshaft and the temperature of the heater head based at least on the state of charge of the battery. A wheel motor is coupled to the battery output and to a set of wheels, including at least one member such that the wheel motor when powered by the battery, drives the set of wheels causing the locomotion of the mobile auxiliary power unit. In accordance with another embodiment, the mobile auxiliary power unit may include a platform coupled to the set of wheels, the platform for supporting a user.

BRIEF DESCRIPTION OF THE DRAWINGS

The invention will be more readily understood by reference to the following description taken with the accompanying drawings, in which.

DETAILED DESCRIPTION OF PREFERRED EMBODIMENTS

Figure 1:
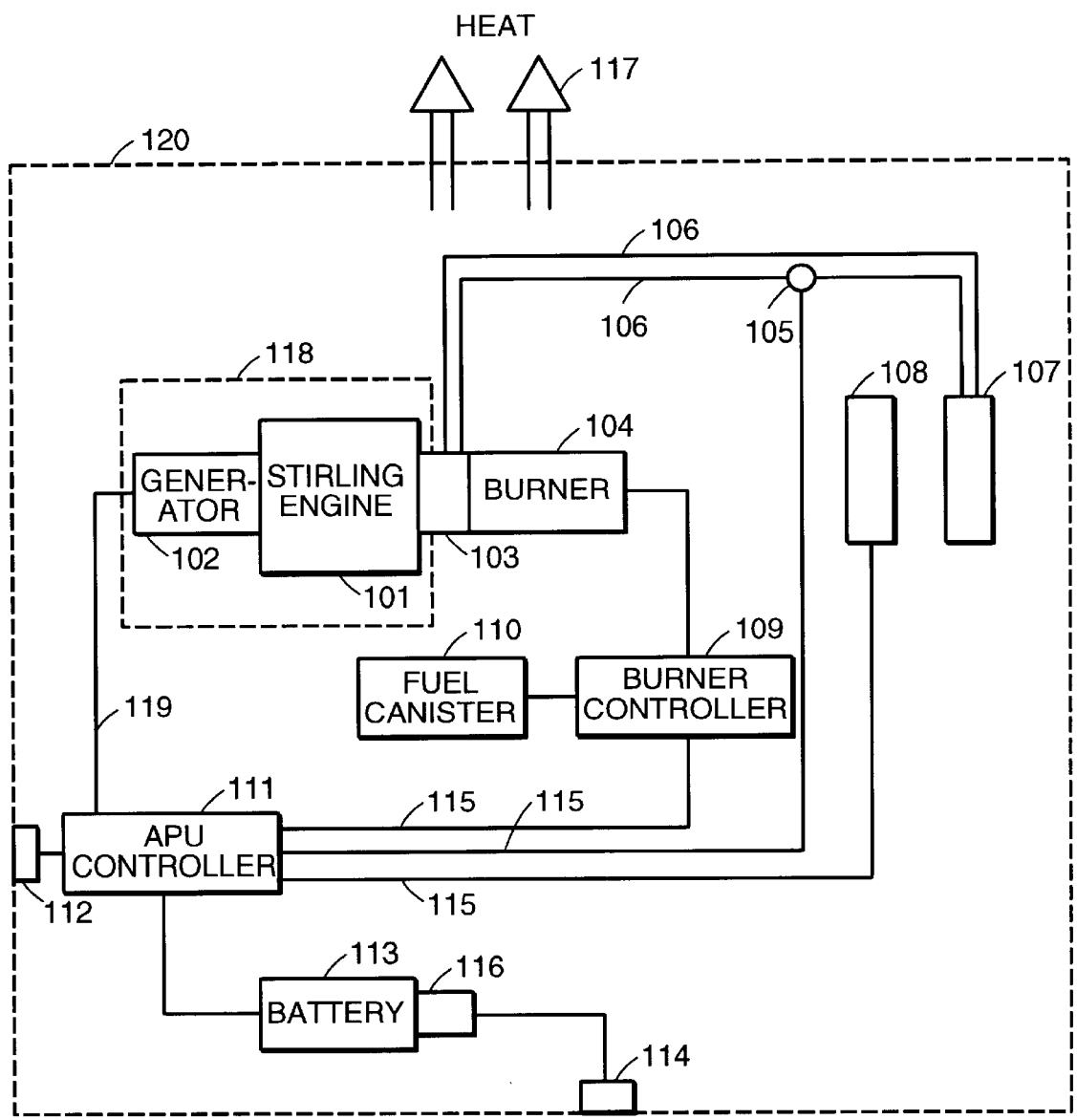
FIG. 1 is a schematic block diagram of an auxiliary power unit in accordance with a preferred embodiment of the invention.

FIG. 1 is a schematic block diagram of an auxiliary power unit ("APU") 100 in accordance with a preferred embodiment of the invention. APU 100 includes an external combustion engine 101 coupled to a generator 102. In a preferred embodiment, the external combustion engine 101 is a Stirling cycle engine. The outputs of the Stirling cycle engine 101 during operation include both mechanical energy and residual heat energy. Heat produced in the combustion of a fuel in a burner 104 is applied as an input to the Stirling cycle engine 101, and partially converted to mechanical energy. The unconverted heat or thermal energy accounts for 65 to 85% of the energy released in the burner 104. This heat is available to provide heating to the local environment around the APU in two forms: a smaller flow of exhaust gas from the burner 104 and a much larger flow of heat rejected at the cooler 103 of the Stirling engine. The exhaust gases are relatively hot, typically 100 to 300° C., and represent 10 to 20% of the thermal energy produced by the Stirling engine 101. The cooler rejects 80 to 90% of the thermal energy at 10 to 20° C. above the ambient temperature. The heat is rejected to either a flow of water or, more typically, to the air via a radiator 107. Stirling cycle engine 101 is of a size such that the APU 100 is portable. A portable APU that provides both electric power and heat to indoor areas is typically less than 5 kW. Larger units would reject too much energy to be used in an indoor area. For additional information relating to preferred embodiments of a Stirling cycle engine, see pending U.S. patent application No. 09/115,383, filed Jul. 14, 1998; pending U.S. patent application No. 09/115,381, filed Jul. 14, 1998; U.S. Provisional Patent Application No. 60/116,483, filed Jan. 20, 1999; and pending U.S. patent application No. 09/335,392, filed Jun. 17, 1999, the disclosures of which are herein incorporated by reference in their entirety.

As shown in FIG. 1, Stirling engine 101 is powered directly by a heat source such as burner 104. Burner 104 combusts a fuel to produce hot exhaust gases which are used to drive the Stirling engine 101. A burner control unit 109 is coupled to the burner 104 and a fuel canister 110. Burner control unit 109 delivers a fuel from the fuel canister 110 to the burner 104. The burner controller 109 also delivers a measured amount of air to the burner 104 to advantageously ensure substantially complete combustion. The fuel combusted by burner 104 is preferably a clean burning and commercially available fuel such as propane. A clean burning fuel is a fuel that does not contain large amounts of contaminants, the most important being sulfur. Natural gas, ethane, propane, butane, ethanol, methanol and liquefied petroleum gas ("LPG") are all clean burning fuels when the contaminants are limited to a few percent. One example of a commercially available propane fuel is HD-5, an industry grade defined by the Society of Automotive Engineers and available from Bernzomatic. In accordance with an embodiment of the invention, and as discussed in more detail below, the Stirling engine 101 and burner 104 provide substantially complete combustion in order to provide high thermal efficiency as well as low emissions. The characteristics of high efficiency and low emissions are key to using the APU 100 indoors.

Figure 2:
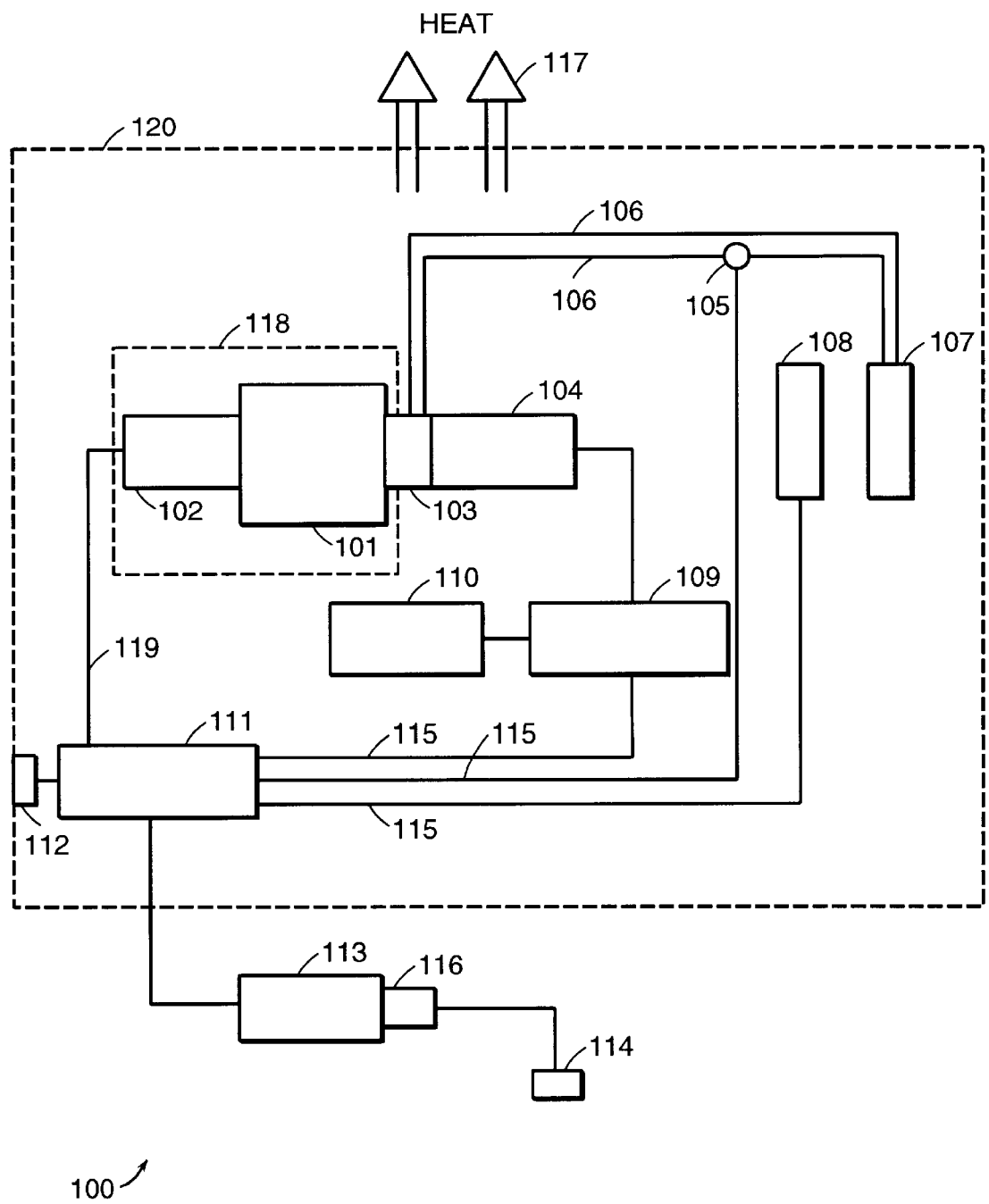
FIG. 2 is a schematic block diagram of an auxiliary power unit in accordance with an alternative embodiment of the invention.

Generator 102 is coupled to a crankshaft (not shown) of Stirling engine 101. It should be understood to one of ordinary skill in the art that the term generator encompasses the class of electric machines such as generators wherein mechanical energy is converted to electrical energy or motors wherein electrical energy is converted to mechanical energy. The generator 102 is preferably a permanent magnet brushless motor. A rechargeable battery 113 provides starting power for APU 100 as well as direct current ("DC") power to a DC power output 112. In a further embodiment, APU 100 also advantageously provides alternating current ("AC") power to an AC power output 114. An inverter 116 is coupled to the battery 113 in order to convert the DC power produced by battery 113 to AC power. In the embodiment shown in FIG. 1, the battery 113, inverter 116 and AC power output 114 are disposed within an APU enclosure 120. In an alternative embodiment, as shown in FIG. 2, the battery 113, inverter 116 and the APU power output 114 may be separate from the APU enclosure 120.

In the course of operation, Stirling engine 101 also produces heat 117 from, for example, the exhaust gases of the burner 104 as well as the supply and extraction of heat from a working fluid. Accordingly, when used inside of a building, the excess heat produced by the Stirling engine 101 may be used to advantageously heat the atmosphere surrounding the APU 100. In this manner, the APU 100 may be used to provide both electrical power and heat to an indoor area such as a building or a residence.

Figure 3:
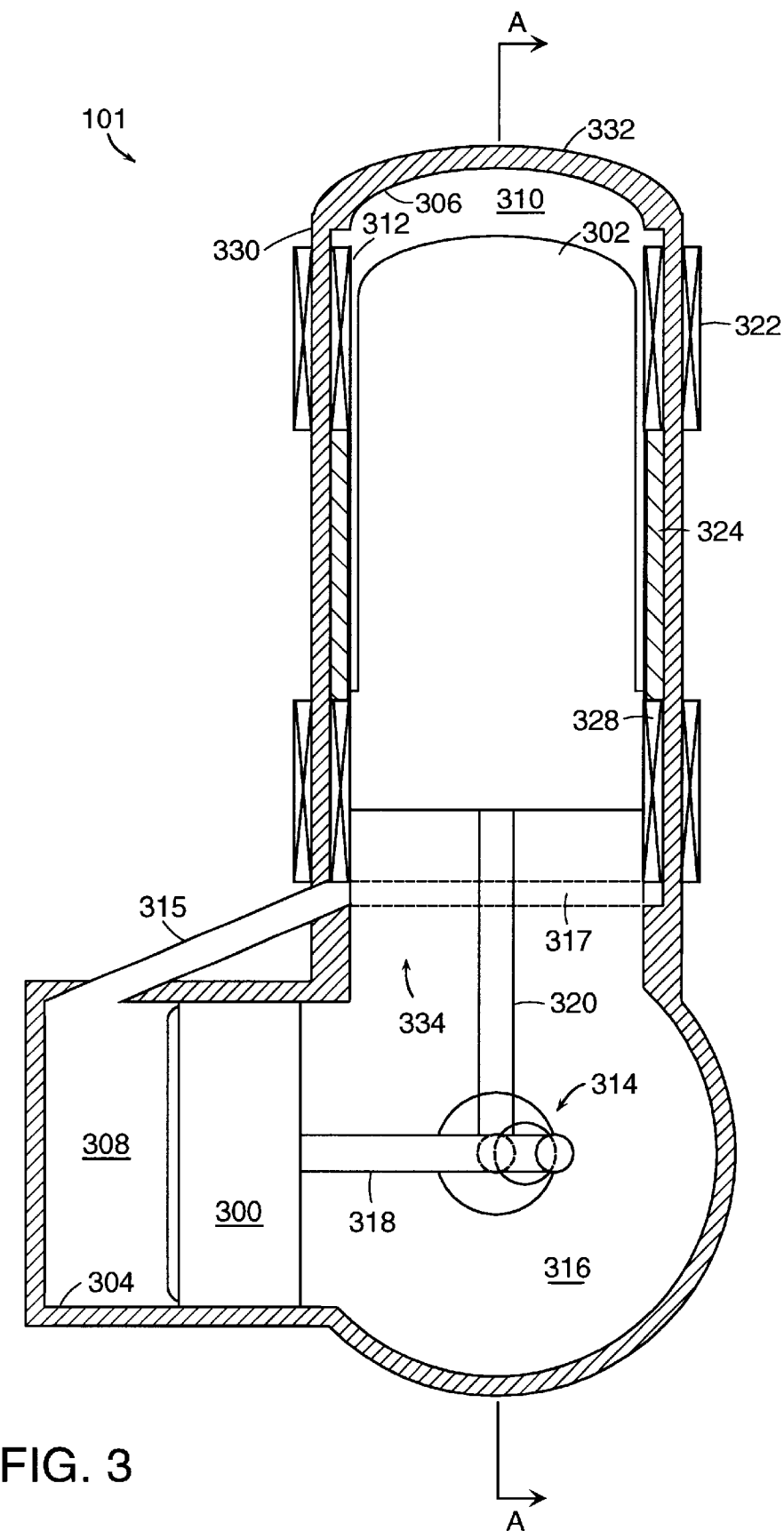
FIG. 3 is a cross section view of a Stirling cycle engine in accordance with a preferred embodiment of the invention.

The operation of Stirling cycle engine 101 will now be described in more detail with respect to FIG. 3 which is a cross-sectional view of a Stirling engine in accordance with an embodiment of the invention. The configuration of Stirling engine 101 shown in FIG. 3 is referred to as an alpha configuration, characterized in that a compression piston 300 and an expansion piston 302 undergo linear motion within respective and distinct cylinders: compression piston 300 in a compression cylinder 304 and expansion piston 302 in an expansion cylinder 306. The principle of operation of a Stirling engine configured in an "alpha"configuration and employing a first "compression" piston and a second "expansion" piston is described at length in pending U.S. application No. 09/115,383, filed Jul. 14, 1998 and pending U.S. patent application No. 09/115,381, filed Jul. 14, 1998, which have been incorporated herein by reference above. The alpha configuration is discussed by way of example only, and without limitation of the scope of any appended claims.

In addition to compression piston 300 and expansion piston 302, the main components of Stirling engine 101 include a burner (not shown), a heater heat exchanger 322, a regenerator 324, and a cooler heat exchanger 328. Compression piston 300 and expansion piston 302, referred to collectively as pistons, are constrained to move in reciprocating linear motion within respective volumes 308 and 310 defined laterally by compression cylinder 304 and expansion cylinder liner 312. The volumes of the cylinder interior proximate to the burner heat exchanger 322 and cooler heat exchanger 328 will be referred to, herein, as hot and cold sections, respectively of engine 101. The relative phase (the "phase angle") of the reciprocating linear motion of compression piston 300 and expansion piston 302 is governed by their respective coupling to drive mechanism 314 housed in crankcase 316. Drive mechanism 314 may be one of various mechanisms known in the art of engine design which may be employed to govern the relative timing of pistons and to interconvert linear and rotary motion. For additional information relating to a preferred drive mechanism 314, see pending U.S. patent application Ser. No. 09/335,392, filed Jun. 17, 1999, entitled "Folded Guide Link Stirling Engine", which is incorporated herein by reference.

Compression piston 300 and expansion piston 302 are coupled, respectively, to drive mechanism 33 via a first connecting rod 208 and a second connecting rod 320. The volume of compression cylinder 308 is coupled to cooler heat exchanger 328 via duct 205 to allow cooling of compressed working fluid during the compression phase. Duct 205, more particularly, couples compression volume 308 to the annular heat exchangers comprising cooler heat exchanger 328, regenerator 203, and heater heat exchanger 322. The burner (not shown) combusts a fuel in order to provide heat to the heater heat exchanger 322 of a heater head 330 of the Stirling engine. The expansion cylinder and piston are disposed within a heater head 330 such that the working fluid in the expansion cylinder may be heated via the heater heat exchanger 322. For additional information relating to a preferred configuration of a burner, regenerator 203 and heater head 330, see co-pending U.S. patent application Ser. No. 09/517,123, attorney docket number 2229/105, entitled "Stirling Engine Thermal System Improvements".

Returning to FIG. 1, the Stirling cycle engine 101 and generator 102 are disposed within a pressure vessel 118. The pressure vessel 118 contains a high pressure working fluid, preferably helium or nitrogen at 20 to 30 atmospheres pressure. The expansion cylinder and piston (shown in FIG. 3) of the Stirling engine 101 extend through the pressure vessel 118 and a cold collar (or cooler) 103. The end of the expansion cylinder (including heater head 330) is contained within the burner 104. The cold collar 103 circulates a cooling fluid through cooling lines 106 and through radiator 107. The cooling fluid is pumped through the cold collar 103 by a cooling pump 105. A fan 108 forces air past the radiator 107 thereby heating the air and cooling the cooling fluid. The heated air 117 may then be forced through openings in the APU enclosure 120 to heat the surrounding area such as the room of a building. In alternative embodiments, the excess heat 117 created by the combustion within burner 104 may be directly provided to the surrounding ambient air.

The pressure vessel 118 has a pass-through port for an electrical connection 119 between the generator 102 contained within the pressure vessel 118 and an APU controller 111. The APU controller 111 supplies power to the cooling pump 105, fan 108, and the burner controller 109 through power supply lines 115. The APU controller 111 also controls the power output of the APU as well as the charge level of the battery 113 by varying the speed and temperature of the Stirling engine. APU controller 111 provides command signals to the burner control unit 109 in order to control the temperature of the Stirling engine 101. APU controller 111 also provides command signals to generator 102 in order to control the speed of the Stirling engine 101.

Figure 4A:
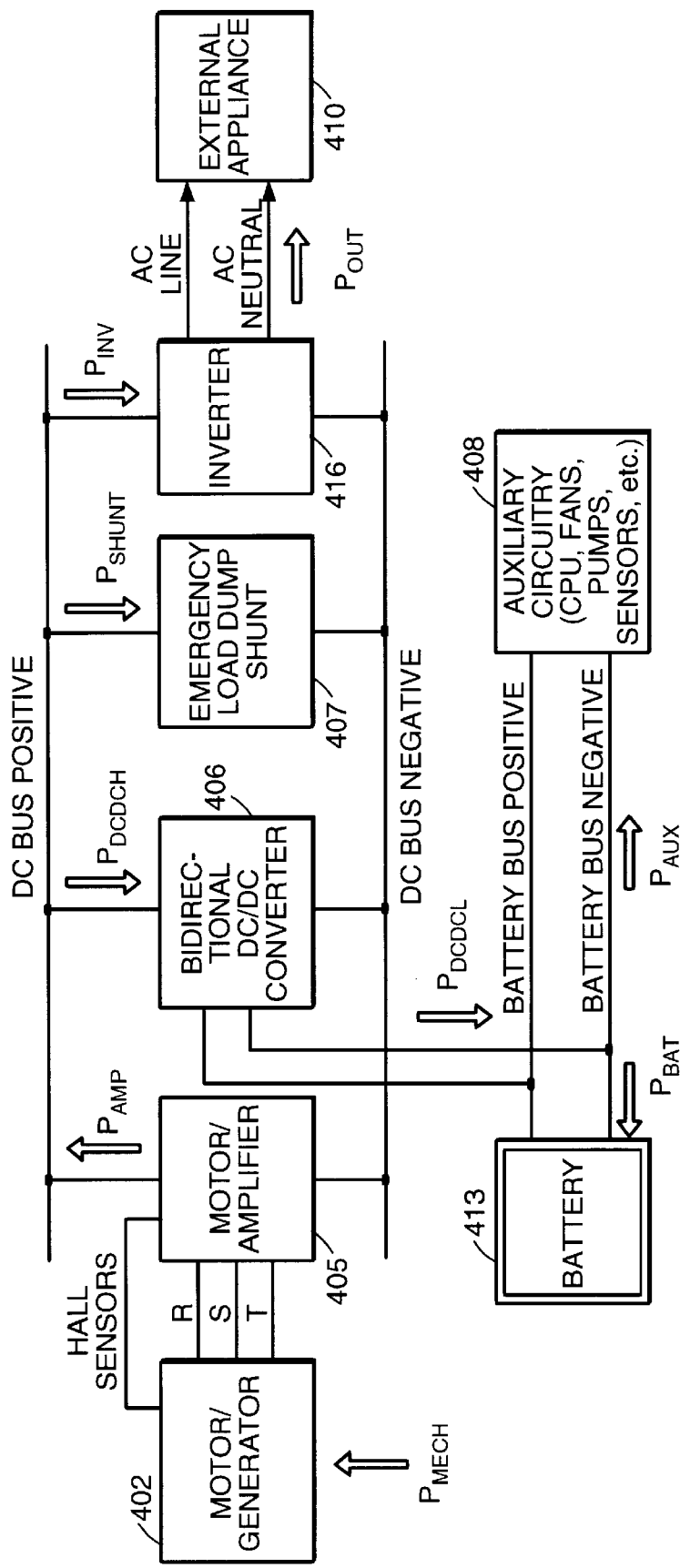
FIG. 4A is a schematic block diagram of the power control system for the engine of the APU of FIG. 1 in accordance with an embodiment of the invention.

The power output of generator 102 and Stirling engine 101 are controlled using APU controller 111 so as to maintain the optimal charge and voltage levels in the battery 113. Electrical loads will reduce the charge and voltage of the battery 113 causing the APU controller 111 to command additional power from the engine. FIG. 4A is a schematic block diagram of the power control system of the APU included in the APU controller 111 (shown in FIG. 1) in accordance with an embodiment of the invention. The power control system controls the speed and temperature of the Stirling engine in order to provide the necessary power to meet the demand (or load) placed on the APU and maintain the charge level of the battery. The power control system as shown in FIG. 4A includes a motor/generator 402, a motor-amplifier 405, a battery 413 and an inverter 416.

As discussed above with respect to FIG. 1, the generator 402 is coupled to the crankshaft of a Stirling engine (not shown). The Stirling engine provides mechanical power ($P_{mech}$) to the generator 402 which in turn converts the mechanical power to three-phase electrical power. Generator 402 also, as discussed in more detail below, acts as an adjustable load on the engine in order to control the speed of the engine. Generator 402 delivers the three-phase electrical power to motor-amplifier 405. Motor-amplifier 405 transfers electrical power produced by the motor generator 402 to a high voltage DC bus ($P_{amp}$). The power provided to the high voltage DC bus ($P_{amp}$) is delivered to a DC to DC converter 406 ($P_{dcdch}$) which steps down the power to a low voltage DC bus for delivery to the battery 413 ($P_{bat}$). The DC to DC converter 406 may also be used to step up the power to the high voltage DC bus used for power control and AC power conversion. Alternate embodiments may omit the DC to DC converter and connect the high voltage DC bus directly to the battery 413. Battery 413 is used to start the Stirling engine and to provide power to auxiliary circuitry 408 of the APU such as fans, pumps, etc., as well as to provide output power when the load on the APU exceeds the power produced by the motor/generator 402. As described further below, battery 413 acts as an energy reservoir during the operation of the APU.

An emergency shunt 407 may be used to remove excess power from the high voltage DC bus in the case of an overvoltage condition in either DC bus. In one embodiment, the emergency shunt resistors are located in the water of the radiator 107 (shown in FIG. 1). In this manner, the excess heat produced by the shunt resistors when they are utilized to remove excess power, is advantageously absorbed by the same system used to dissipate the excess heat of the APU (i.e., radiator 107). An inverter 416 is used to deliver AC power ($P_{out}$) to an external appliance or load 410. The inverter 416 draws power ($P_{inv}$) from the DC bus.

The charge level of the battery 413 reflects changes in the output load 410. In order to provide the required power output, the power control system of FIG. 4A attempts to keep the battery 413 at its optimum charge, without overcharging, in response to changes in the output load 410. The optimum charge is not necessarily a full charge and may be 80–100% of the full charge. The optimum charge is a tradeoff between keeping the battery ready for extended periods of discharge and increasing the battery cycle life. Charging the battery to nearly 100% of full charge maximizes the availability of the battery for extended periods of discharge but also stresses the battery, resulting in a shorter battery cycle life. Charging the battery to less than full charge reduces the stresses placed on the battery and thereby extends the battery cycle life but also reduces the energy available in the battery for sudden load changes. The selection of the optimum charge will depend on the expected load variations placed on the APU and the battery capacity and is well within the scope of one of ordinary skill in the power management art. In a preferred embodiment, the optimum charge is set at 90% of full charge. Another goal of the power control system is to reduce the fuel consumption of the engine by maximizing the efficiency from fuel input to power output. The power control system of FIG. 4A adjusts the engine temperature and the engine speed in order to produce the desired battery charge and thus, the required power output.

The charge of the battery 413 may be roughly estimated by the battery voltage. As described above, differences between the load power ($P_{out}$) and the power generated by the Stirling engine ($P_{mech}$ or $P_{amp}$) will result in power flow to or from the battery 413. For example, if the engine does not produce enough power to meet the demand of the load 410, the battery 413 will provide the remaining power necessary to support the load 410. If the engine produces more power than required to meet the demand of the load 410, the excess power may be used to charge the battery 413. The power control system determines whether it is necessary to command the engine to produce more or less power in response to changes in the load. The engine speed and engine temperature are then adjusted accordingly to produce the required power. When the battery 413 is being discharged (i.e. The demand from the load 410 is greater than the power produced by the engine for extended periods of time), the engine temperature and speed are adjusted so that the engine produces more power. Typically, the engine temperature and speed are increased in order to produce more power. Preferably, when more power is needed, raising engine temperature is given preference over raising engine speed. Conversely, when the battery 413 is being charged for extended periods of time (i.e., the engine is producing more power than the load 410 demands), the engine temperature and speed are decreased to decrease the amount of power produced by the engine. Typically, the engine temperature and speed are adjusted to decrease the amount of power produced by the engine. Preferably, when less power is needed, reducing engine speed is given preference over reducing engine temperature.

Once the power control system determines the desired engine temperature and speed based on the desired battery power, the power control system sends a temperature command to the burner control unit 109 (shown in FIG. 1) indicating the desired engine temperature and a speed command to the generator 402 indicating the desired engine speed. As mentioned above, the speed of the engine may be controlled by modulating the torque applied to the crankshaft of the engine by the motor/generator 402 using the motor amplifier 405. As such, the generator 402 acts as an adjustable load on the engine. When the generator 402 increases demand on the engine, the load on the crankshaft increases and thereby slows down the speed of the engine. The motor amplifier 405 adjusts the motor current in order to obtain the necessary torque in the motor and accordingly the necessary engine speed.

A Stirling cycle engine (or other external combustion engine) typically has a long response time to sudden changes in the load (i.e., there is a time lag between the engine's receipt of a increase or decrease temperature command and the engine reaching the desired temperature). The power control system, therefore, is designed to account for the lengthy response time of a Stirling cycle engine. For a sudden increase in the load 410, the torque load applied by the generator 402 on the crankshaft of the engine is reduced, thereby allowing the crankshaft to speed up and temporarily maintain an increased power output of the generator 402 until an increased temperature command sent to the burner control unit 109 (shown in FIG. 1) takes effect. For a sudden load decrease, the torque applied by the generator 402 on the crankshaft of the engine may be increased in order to slow down the crankshaft and decrease the power output until a decreased temperature command sent to the burner control unit takes effect. The excess charge or power produced by the generator 402 may be used to charge the battery 413. As discussed above, any further excess electrical energy may also be directed to the emergency shunt 407. The process of controlling the temperature of the engine using the burner control unit 109 is described in more detail below with respect to FIGS. 6–11.

Figure 4B:
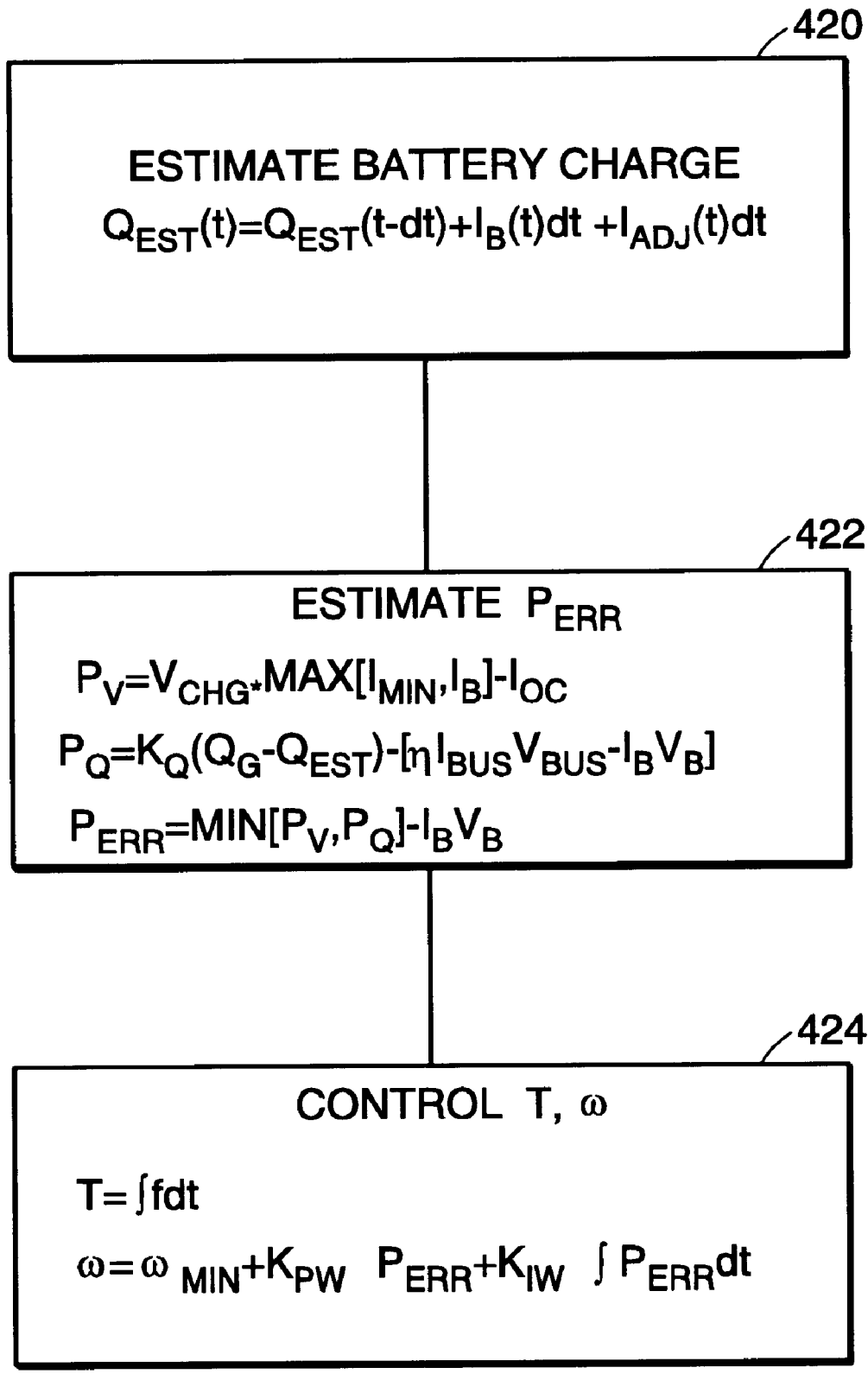
FIG. 4B is a schematic block diagram of a method of control for the power control system of FIG. 4A in accordance with an embodiment of the invention.

FIG. 4B is a schematic block diagram of a method for determining the desired engine temperature and speed in order to provide the required electrical power to maintain the optimal charge for the battery and meet the applied load. First, at block 420, the power control system estimates the state of charge of the battery. The estimated battery state of charge ($Q_{est}$) is determined using the measured battery current ($I_B$) as well as, when necessary, an adjustment current ($I_{adj}$) as shown in the following equation:

$$Q_{est}(t) = Q_{est}(t-dt) + I_B(t)dt + I_{adj}(t)dt, \qquad \text{(Eqn. 1)}$$

in block 420. When the engine is first started, the initial estimated state of charge ($Q_{est}$) is set to a preselected value. In a preferred embodiment, the initial state of charge value is 10% of full charge. The adjustment current is then used to correct the battery current such that $Q_{est}$ approaches a value near the actual state of charge. By selecting a low initial value for $Q_{est}$ at startup, faster correction is achieved because a lower value for $Q_{est}$ allows for a higher charging current.

The adjustment current may be selected based on the known V-I characteristics of the battery. In a preferred embodiment, the battery is a lead-acid battery. The determination of the V-I plane for a particular battery is well within the scope of one of ordinary skill in the art. The V-I plane for the battery 413 (shown in FIG. 4A) may be divided into operating regions where the state of the charge of the battery is reasonably known. The measured battery voltage, $V_B$, and battery current, $I_B$, are used to identify the current state of the battery in the V-I plane. The estimated charge $Q_{est}$ is then compared to the identified state of charge corresponding to the region of the V-I plane in which the measured battery voltage and current fall. The adjustment current, $I_{adj}$, is estimated by taking the product of a constant, which is a function of the measured voltage and current of the battery, and the difference between the estimated state of charge $Q_{est}$ and the state of charge estimated using the V-I plane and the measured battery voltage and current.

At block 422, a power error $P_{err}$ is determined by comparing the desired battery power $P_{batdes}$ and the actual battery power $P_B$. The power error $P_{err}$ is indicative of whether the APU must produce more or less power output. The actual battery power $P_B$ is the measured battery power flowing into the battery ($I_B V_B$). The desired battery power may be estimated using two methods. The first method is based on the charging voltage of the battery $V_{chg}$ and the second method is based on the estimated state of charge $Q_{est}$ of the battery. In the following discussion, the desired battery power estimated using the first method will be referred to as $P_V$ and the desired battery power estimated using the second method will be referred to as $P_Q$.

The first method estimates a desired battery power, $P_V$, using the charging voltage of the battery ($V_{chg}$). In a preferred embodiment, $P_V$ is estimated using the following equation:

$$P_V = V_{chg} * \text{MAX}[I_{min}, I_B] - I_{oc}, \quad \text{(Eqn. 2)}.$$

The charging voltage $V_{chg}$ is the optimum battery voltage to keep the battery charged and is typically specified by the manufacturer of a particular battery. For example, in a preferred embodiment, the lead-acid battery has a charging voltage of 2.45V/cell. $V_{chg}$ is multiplied by the larger of either the measured battery current ($I_B$) or a predetermined minimum current value ($I_{min}$) $I_{min}$ may be selected based on the known characteristics of the V-I plane of the battery. For example, in one embodiment, when the measured battery voltage $V_B$ is much less than $V_{chg}$, $I_{min}$ may be set to a high value in order to quickly increase the voltage of the battery, $V_B$, up to $V_{chg}$. If $V_B$ is near $V_{chg}$, $I_{min}$ may be set to a low value as it will not require as much additional energy to bring the battery voltage $V_B$ up to $V_{chg}$. If $V_B$ is greater than $V_{chg}$, however, an overcharge current $I_{oc}$ may be subtracted from the greater of $I_B$ and $I_{min}$ in order to avoid an overvoltage condition.

The second method estimates a desired battery power $P_Q$ based on the estimated state of charge ($Q_{est}$) of the battery (as determined in block 420). In a preferred embodiment, $P_Q$ is estimated using the following equation:

$$P_Q = K_Q(Q_G - Q_{est}) - (\eta I_{bus} V_{bus} - I_B V_B), \quad \text{(Eqn. 3)}$$

where:

$K_Q$ is a gain constant that may be configured, either in design of the system or in real-time, on the basis of current operating mode and operating conditions as well as the preference of the user;

$Q_G$ is the desired state of charge of the battery;

$I_{bus}$ is the measured bus current exiting the motor amplifier;

$V_{bus}$ is the measured bus voltage; and $\eta$ is an estimated efficiency factor for the DC/DC converter (shown in FIG. 4A) between the motor amplifier and the battery.

The desired power $P_Q$ is based on the difference between the desired charged state $Q_G$ of the battery and the estimated charge state $Q_{est}$ of the battery. $Q_G$ is a predetermined value between 0 (fully discharged) and 1 (fully charged) and represents the state of charge the controller is trying to maintain in the battery. In a preferred embodiment, the desired state of charge of the battery is 90% of full charge. The farther away the estimated battery charge $Q_{est}$ is from the desired charge state $Q_G$, the more power which can safely be requested to charge the battery. The closer $Q_{est}$ is to $Q_G$, the less power that is needed to bring the battery voltage, $V_B$, up to $V_{chg}$.

The estimation of the desired battery power $P_Q$ is also adjusted to account for possible load changes. If the load on the APU were suddenly decreased, the excess power produced by the engine must be directed elsewhere until the amount of power generated by the engine may be reduced (i.e., the system has time to react to the sudden change in load). The excess power represents the worst case additional power that could flow into the battery if the load were suddenly removed from the system. Accordingly, it is desirable to select a desired battery power which leaves room in the battery to absorb the excess power produced by a change in the load. The excess power is subtracted from $P_Q$ in order to leave additional room in the battery to absorb the excess power. The excess power may be determined by comparing the power generated by the engine to the power entering the battery and is represented by the term $\eta I_{bus} V_{bus} - I_B V_B$ in Eqn. 3 above. The power generated by the engine is estimated using the bus voltage $V_{bus}$ measured at the motor amplifier and the bus current $I_{bus}$ measured exiting the motor amplifier. The power entering the battery is the product of the measured battery voltage and current ($I_B V_B$).

At block 422, the minimum of the two estimated desired battery powers $P_V$ and $P_Q$ is used to determine the power error $P_{err}$. The power error $P_{err}$ is the difference between the selected desired battery power and the measured power flowing into the battery as shown by the following equation:

$$P_{err} = \text{MIN}[P_V, P_Q] - I_B V_B, \quad \text{(Eqn. 4)}$$

The measured power $P_B$ flowing into the battery is the product of the measured battery current $I_B$ and the measured battery voltage $V_B$. As mentioned above, the power error $P_{err}$ is indicative of whether the APU must produce more or less power output. In other words, if the actual battery power is less than the desired battery power, the APU will need to produce more power (i.e., increase speed and temperature). If the actual battery voltage is greater than the desired battery voltage, the APU will need to produce less power (i.e., decrease speed and temperature).

In response to the power error signal $P_{err}$, the power control system produces an engine temperature command signal output (T) and an engine speed command signal output ($\omega$) at block 424 which indicate the engine temperature and speed required to produce the desired power. In a preferred embodiment, the engine temperature T is proportional to the engine speed and the integral of a function of $P_{err}$. In this embodiment, T is governed by the control law $$T = \int f \, dt, \text{ where:} \quad \text{(Eqn 5)}$$

$f = K_{it} P_{err}$ when $\omega_{mot} < \omega_{motidle}$;

$f = K_{it} P_{err} + K_{drift}$ when $P_{err} \geq 0$ and $\omega_{mot} \geq \omega_{motidle}$; and $f = K_{drift}$ when $P_{err} < 0$ and $\omega_{mot} > \omega_{motidle}$.

In the above control law, $\omega_{mot}$ is the measured engine speed, $\omega_{motidle}$ is a predetermined nominal engine speed, and $K_{it}$ is a gain constant. When the speed of the engine is greater than a nominal motor speed, an additional drift term ($K_{drift}$) is added which has the effect of slowly increasing the engine temperature as well as indirectly decreasing the engine speed to the nominal speed of the engine. Operation of the engine at the nominal engine speed maximizes the efficiency of the engine.

In a preferred embodiment, the speed of the engine (ω) is proportional to the power error $P_{err}$ and the integral of $P_{err}$ and is governed by the following control law:

$$\omega = \omega_{min} + K_{pw} P_{err} + K_{iw} \int P_{err} dt \quad \text{(Eqn. 6)}$$

where:

$\omega_{min}$ represents the minimum allowable engine speed; and $K_{pw}$ and $K_{iw}$ are gain constants.

The motor speed, ω, is limited to be at least some minimum speed $\omega_{min}$. The engine speed is also limited to a maximum speed $\omega_{max}$ to reduce the engine cooling effect when the speed increases.

Figure 5:
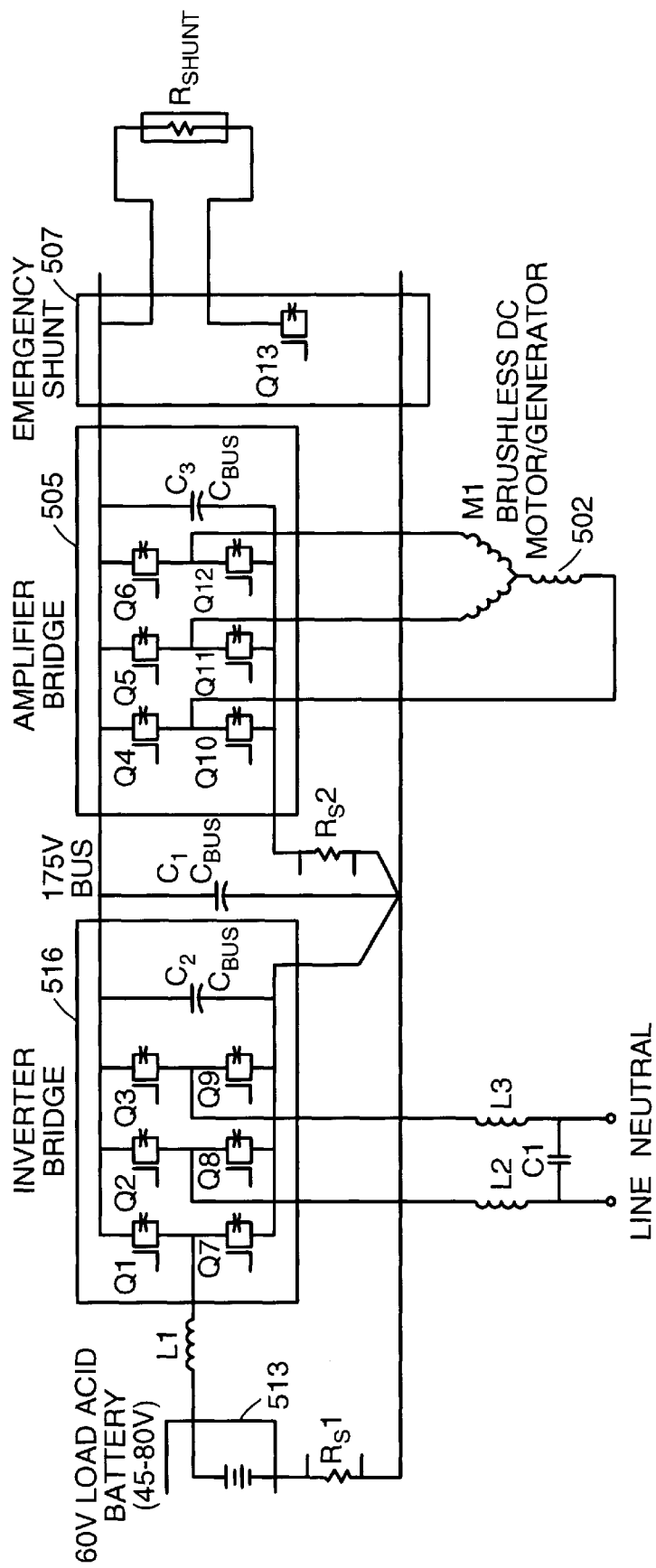
FIG. 5 illustrates the circuitry for the power control system in FIG. 4A in accordance with an embodiment of the invention.

FIG. 5 shows the structural details of the power electronics circuitry of FIG. 4A. The generator 502 is coupled to a battery 513, an inverter 516, an amplifier 505 and an emergency shunt 507. The behavior of these elements is similar to that described above with respect to FIGS. 4A and 4B.

As discussed above with respect to FIGS. 4A and 4B, once the power control system determines the desired engine temperature and speed required to maintain the optimal charge level of the battery, a speed command (ω) is sent to the generator 402 (shown in FIG. 4A) indicating the desired engine speed and a temperature command (T) is sent to the burner control unit 109 (shown in FIG. 1) indicating the desired engine speed. Returning to FIG. 1, the burner control unit 109 controls the burner 104 to achieve the desired engine temperature. The burner control unit 109 delivers a clean burning fuel, preferably propane, supplied from a fuel canister 110 to the burner 104. The burner control unit 109 also delivers a measured amount of air to the burner 104 to ensure substantially complete combustion of the fuel. The burner control unit 109 sets the fuel and air flow rates to provide the required engine temperature and to minimize emissions.

In order to achieve high efficiency and low emissions such that APU 100 may be used inside a residence to advantageously provide both electrical power and heat, Stirling engine 101 and burner 104 provide substantially complete combustion. Preferred methods of improving thermal efficiency and providing low emissions of Stirling engine 101 will now be discussed in more detail in reference to FIGS. 6–11. Components of such thermal efficiency include efficient pumping of an oxidant (typically air, and, referred to herein as "air") through the burner 104 to provide combustion, and the recovery of hot exhaust leaving the heater head 330 (shown in FIG. 3) of the Stirling engine. In many applications, air (or other oxidant) is pre-heated, prior to combustion, nearly to the temperature of the heater head 330, so as to achieve thermal efficiency. There is still a considerable amount of energy left in the combustion gases after the heater head of the Stirling engine has been heated, and, as known to persons skilled in the art, a heat exchanger may be used to transfer heat from the exhaust gases to the combustion air prior to introduction into burner 104. A preheater assembly is discussed in more detail below with respect to FIG. 8.

In addition, minimizing emissions of carbon monoxide (CO), hydrocarbons (HC) and oxides of nitrogen (NOx) requires a lean fuel-air mixture which still achieves complete combustion. A lean fuel air mixture has more air than a stoichiometric mixture (i.e., 15.67 grams of air per gram of propane, for example). As more air is added to the fuel, the emissions of CO, HC and NOx decrease until the amount of air is large enough that the flame becomes unstable. At this point, pockets of the fuel-air mixture will pass through the burner without complete combustion. Incomplete combustion of the fuel-air mixture produces large amounts of CO and HC. The CO and HC emissions will continue to increase as more air is added to the fuel-air mixture until the flame extinguishes at a Lean Blow-Out limit ("LBO"). The LBO will increase as the temperature of the incoming air (i.e., the preheated air) increases. As a result, the optimal fuel-air ratio decreases as the temperature of the preheated air increases during the warmup phase of the engine. Once the engine is warmed up, the fuel-air ratio is adjusted to minimize the emissions produced and to maintain a stable flame. As used in this description and the following claims, a fuel-air ratio is the ratio of the mass of the fuel to the mass of the air flowing into the combustion chamber of the burner.

Accordingly, the fuel-air ratio is first controlled by the burner controller (shown in FIG. 1) to provide the optimal fuel-air ratio for ignition. Once the flame is proved, the fuel-air ratio is controlled to minimize emissions based upon the temperature of the preheated air and the fuel type. The burner control unit then controls the fuel flow rate to bring the heater head 330 temperature up to the commanded temperature. The air flow rate is adjusted in order to maintain a desired level of oxygen in the exhaust of the engine as the fuel flow rate changes and as the air preheat temperature changes.

Figure 6:
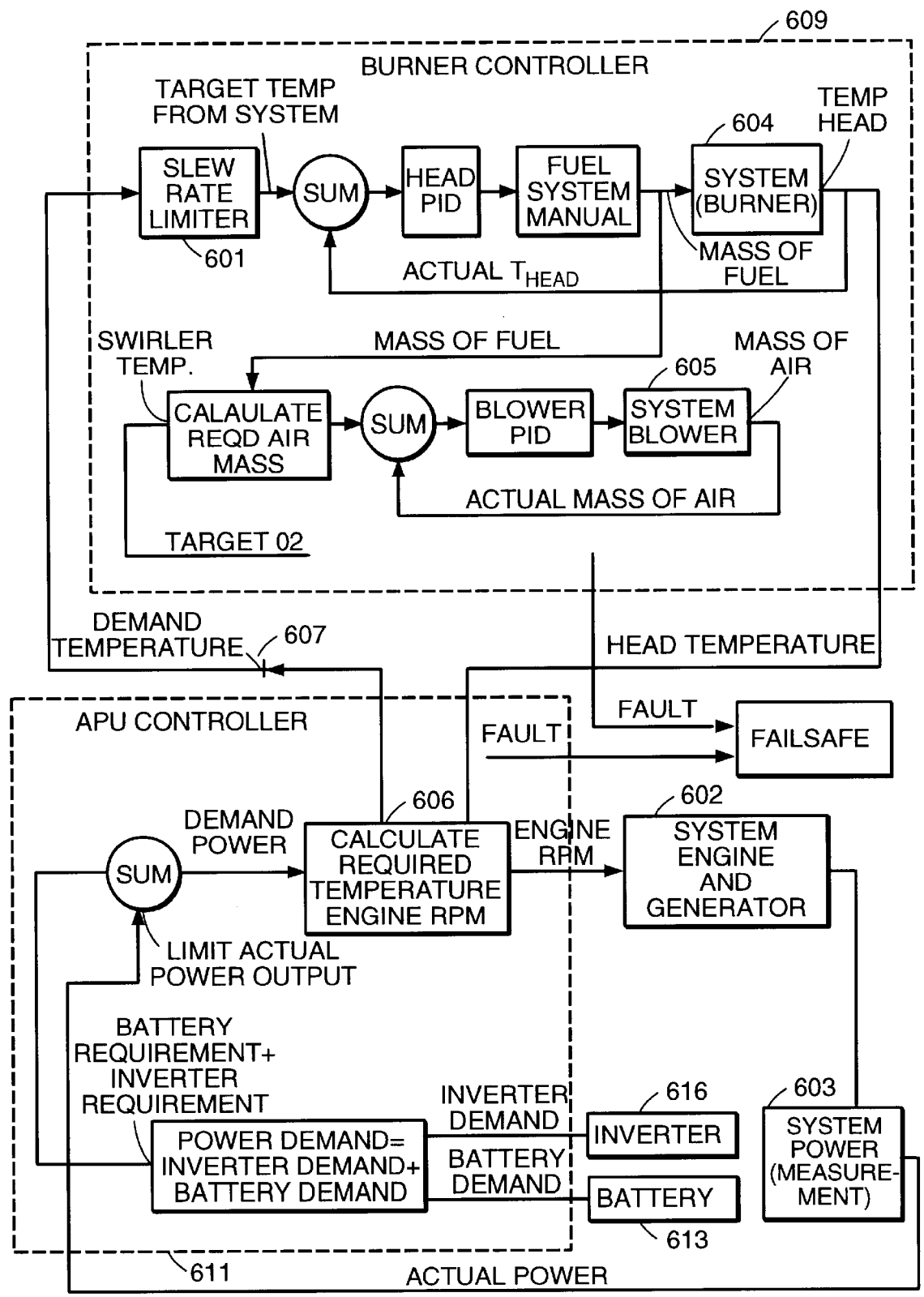
FIG. 6 is a schematic block diagram of the power control system of the APU of FIG. 1 including the burner controller in accordance with an embodiment of the invention.

FIG. 6 is a schematic block diagram of the power control system including the burner control unit 609. APU controller 611 calculates the required engine temperature and engine speed at block 606 as discussed above with respect to FIGS. 4A and 4B. The desired engine temperature (i.e. The desired temperature of the heater head) is provided as a temperature command input 607 to the burner control unit 609. A slew rate limiter 601 is advantageously used to limit the increase in engine temperature so that the temperature increase is gradual in order to minimize temperature over- and undershoot. Upon receiving a temperature command 607 from the APU controller 611 for an engine temperature above a minimum operating temperature, the burner control unit 609 initiates a lighting sequence for the burner 604. A water pump (not shown) and a radiator fan(not shown) are controlled to maintain the temperature of the coolant.

A given fuel will only ignite over a limited range of fuel-air ratios. At ignition, an ignition fuel-air ratio chosen which is equal to or less than the stoichiometric fuel-air ratio corresponding to the fuel being used. In a preferred embodiment, where the fuel is propane, the ignition fuel-air ratio is set to 0.1 grams propane per grams air. The ignition fuel air ratio is maintained until the flame stabilizes and the temperature of the interior of the combustion chamber of the burner 604 increase to a warmup temperature. In a preferred embodiment, the ignition fuel-air ratio is maintained until the heater head 330 temperature reaches 300° C.

Once the flame is stabilized, and the temperature of the combustion chamber of the burner reaches the desired warmup temperature, the fuel-air ratio is then controlled based on the air preheat temperature and the fuel type. As described above, the optimal fuel-air ratio of the fuel-air mixture decreases as the temperature of the preheated air increases. The optimal fuel-air ratio first decreases linearly from a "start" fuel-air ratio for room temperature air to a "run" fuel-air ratio, for warmed up preheated air temperature. The air is considered fully warmed up when it exceeds its known ignition temperature. For example, the ignition temperature for propane is 490° C. In a preferred embodiment, where the fuel is propane, the "start" fuel-air ratio is 0.052 grams fuel to gram air, which results in approximately 4% oxygen in the exhaust of the engine. The "run" fuel-air ratio in the preferred embodiment is 0.026 grams fuel to gram air, which results in approximately 13% oxygen in the exhaust of the engine. Once the air reaches its warmed up preheated temperature, the air flow rate is adjusted to maintain the optimal fuel-air ratio for the warmed up preheated temperature. The air flow rate may be adjusted, for example, in response to a change in the fuel flow rate or a change in the air preheat temperature.

Figure 7:
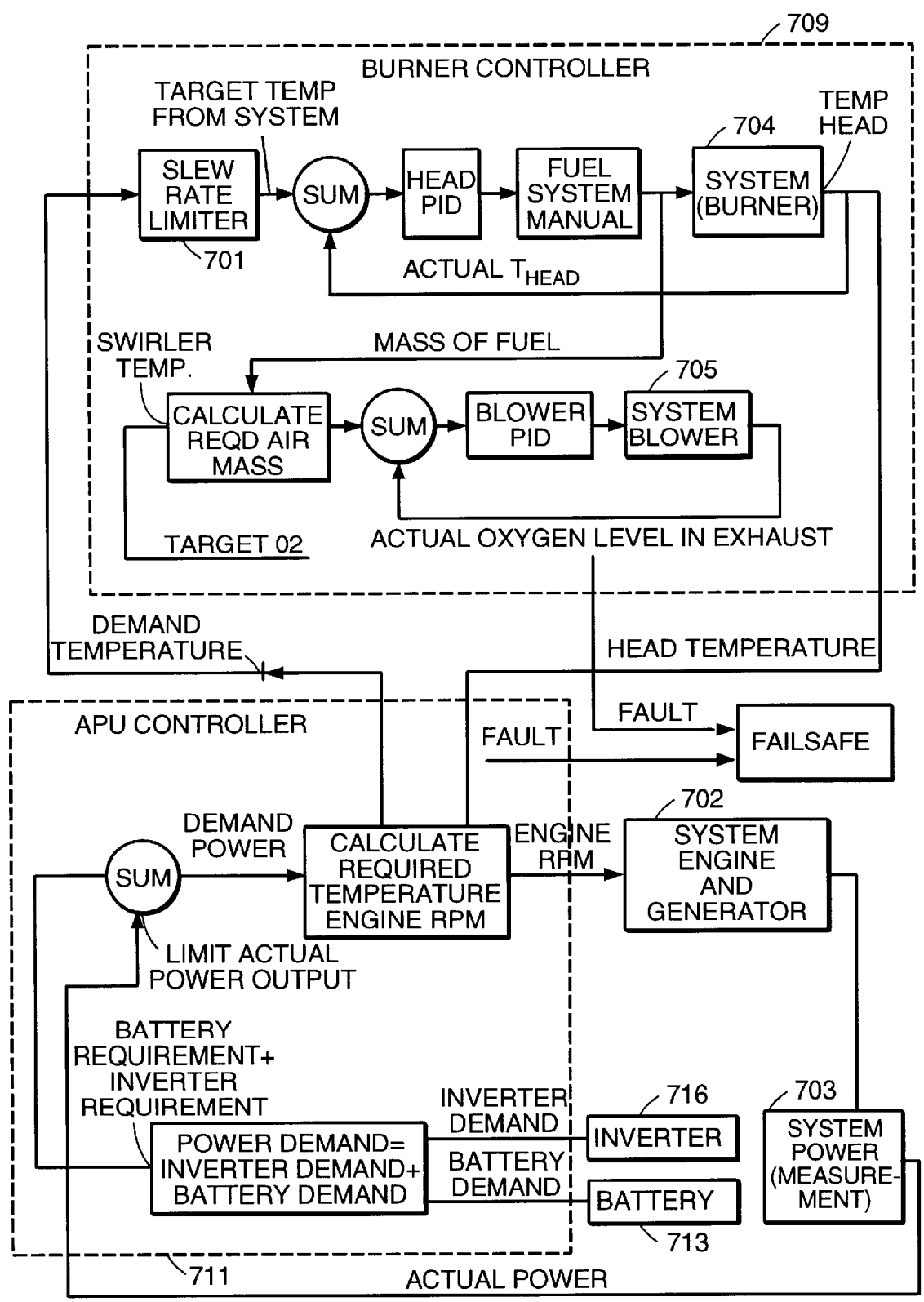
FIG. 7 is a schematic block diagram of the power control system of the APU of FIG. 1 including the burner controller in accordance with an alternative embodiment of the invention.

In the embodiment of FIG. 6, the fuel-air ratio may be determined by measuring the air and fuel mass flow rates. The air flow rate may be measured with a pressure sensor and a venturi tube at the blower 605. The fuel flow rate may be determined from the pressure upstream and downstream of a set of fuel control valves and monitoring which valves are currently commanded open. In an alternative embodiment, the fuel-air ratio may be based on the measurement of the oxygen content in the exhaust of the APU as shown in FIG. 7. An oxygen sensor may be placed in the engine to sample the exhaust gas and measure the percentage of oxygen in the exhaust.

Returning to FIG. 6, the engine temperature ($T_{head}$) is measured and compared to the desired engine temperature 607 using a feed back loop. The engine temperature will continue to be increased (by increasing the fuel and air flow rates) until the engine temperature reaches the desired engine temperature. As discussed previously, the slew rate limiter 601 provides a gradual increase in the temperature to minimize temperature over- and under-shoot. When the APU controller 611 commands a heater head temperature below a minimum heater head temperature, the burner controller 609 turns off the fuel and air and controls the water pump and radiator fan to avoid coolant boil-over.

In addition to providing the optimal fuel-air ratio, the fuel and air combusted in burner 604 must be well-mixed with sufficient amounts of oxygen to limit the emission of carbon monoxide (CO) and hydrocarbon (HC) and, additionally, must be burned at low enough flame temperatures to limit the formation of oxides of nitrogen ($NO_x$). The high temperature of pre-heated air, which as described above is desirable for achieving high thermal efficiency, complicates achieving low emission goals by making it difficult to premix the fuel and air and requiring large amounts of excess air in order to limit the flame temperature. As used herein, the term "auto-ignition temperature" is defined as the temperature at which a fuel will ignite without a temperature-decreasing catalyst under existing conditions of air and fuel pressure. The typical preheated air temperature exceeds the auto-ignition temperature of most fuels, potentially causing the fuel air mixture to ignite before entering the combustion chamber of the burner. One solution to this problem is to use a non-pre-mixed diffusion flame. However, since such diffusion flames are not well mixed, higher than desirable emissions of CO and NOx result. A detailed discussion of flame dynamics is provided by Turns, *An Introduction to Combustion: Concepts and Applications*, (McGraw-Hill, 1996), which is incorporated herein by reference. An increased air flow provided to limit flame temperature typically increases the power consumed by an air pump or blower, thereby degrading overall engine efficiency.

In accordance with an embodiment of the present invention, low emissions and high efficiency may be provided by producing a pre-mixed flame even in the presence of air heated above the auto-ignition temperature of the fuel, and additionally, by minimizing the pressure drop between the air inlet and the flame region thereby minimizing blower power consumption.

The term "flame speed" is defined as the speed at which a flame front will propagate through a particular fuel-air mixture. Within the specification and the following claims, the term "combustion axis" shall refer to the direction of predominant fluid flow upon combustion of the fluid.

Figure 8A:
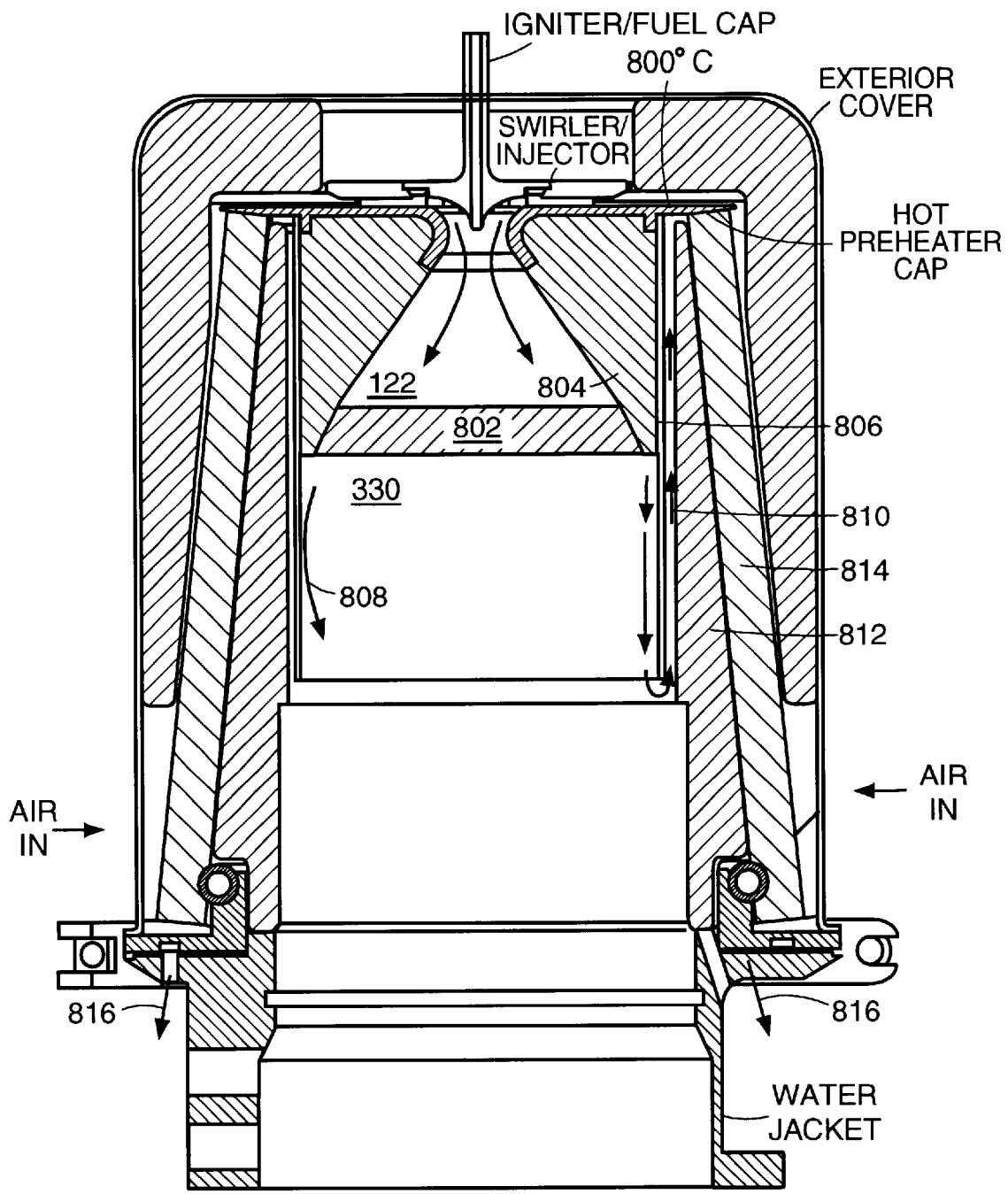
FIG. 8a is a side view in cross section of the burner and exhaust heat recovery assembly, in accordance with an embodiment of the invention.

Typical components of the burner and preheater assemblies, in accordance with embodiments of the present invention, are described with reference to FIG. 8a. The target range for combustion gases is 1700–2300 K, with a preferred range of 1900–1950 K. Operating temperatures are limited by the strength of heater head 330 which must contain working fluid at an operating pressure of typically several atmospheres and by the oxidation resistance of the burner structure. Since the strength and oxidation resistance of metals typically decreases at high temperatures, it is important to shield metal components from the high combustion temperatures. To that end, burner 122 is surrounded by a ceramic combustion chamber 804, itself encased in a metal combustion chamber liner 806, thermally sunk to heater head 330 and cooled by incoming air from the preheater path or by exhaust gases 810. Additionally, heater head 330 is shielded from direct flame heating by head flame cap 802. The exhaust products of the combustion process follow path 808 past heater head 330 through a channel providing for efficient transfer of heat to the heater head and to the working gas contained within the heater head.

Figure 8B:
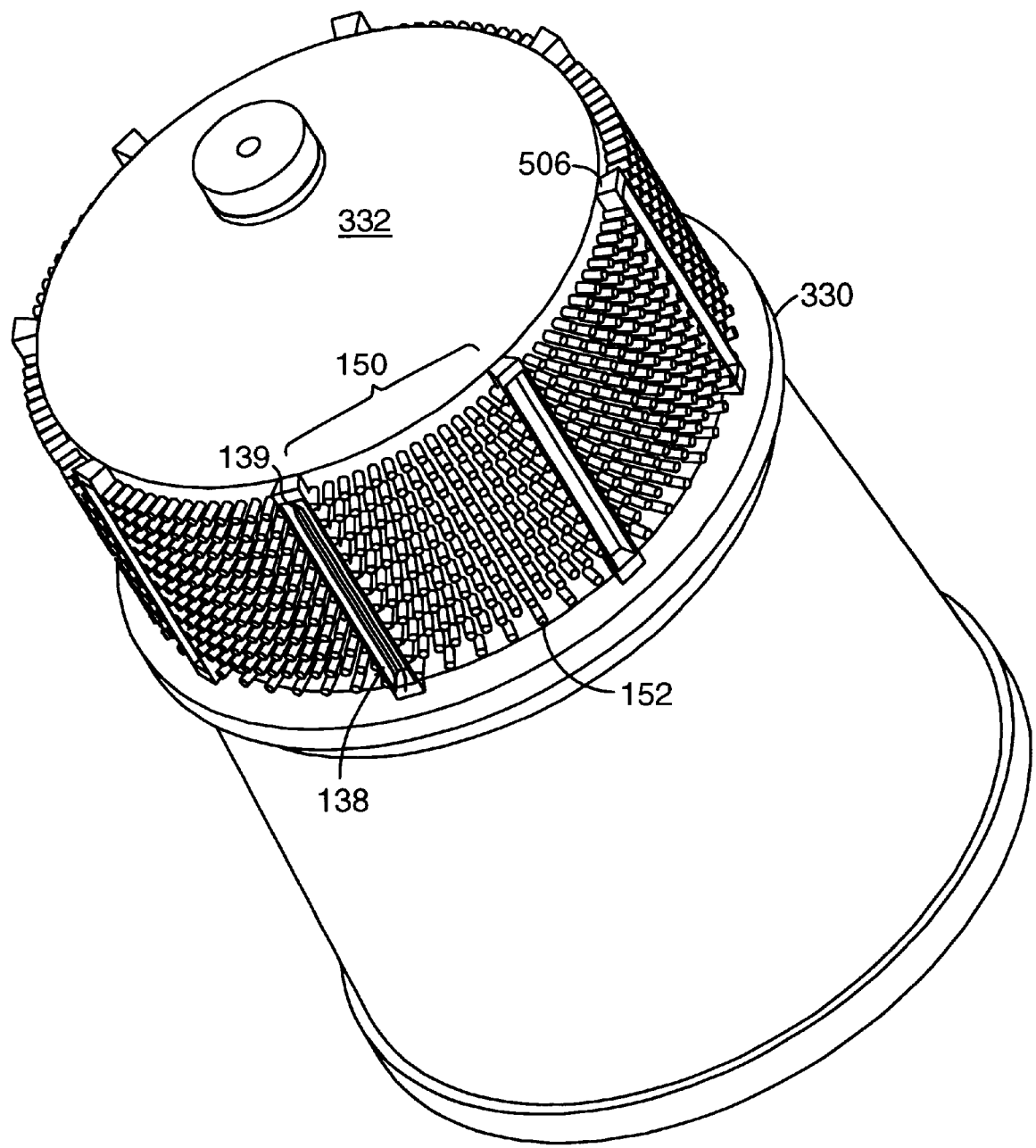
FIG. 8b shows a perspective top view of a heater head including heat transfer pin arrays in accordance with an embodiment of the invention.

The overall efficiency of a thermal engine is dependent in part on the efficiency of heat transfer between the combustion gases and the working fluid of the engine. In order to increase the efficiency of heat transfer from exhaust products of the combustion process generated by burner 122, to the working fluid contained within heater head 330 of the engine, a large wetted surface area, on either side of heater head 330 is required. Referring to FIG. 3, heater head 330 is substantially a cylinder having one closed end 332 (otherwise referred to as the cylinder head) and an open end 334. Closed end 332 is disposed in burner 122 as shown in FIG. 8a. Referring to FIG. 8b, in accordance with a preferred embodiment of the invention, fins or pins may be used to increase the interfacial area between the hot fluid combustion products and the solid heater head 330 so as to transfer heat, in turn, to the working fluid of the engine. Heater head 330 may have heat transfer pins 152, disposed on the exterior surface as shown in FIG. 8b, so as to provide a large surface area for the transfer of heat by conduction to heater head 330, and thence to the working fluid, from combustion gases flowing from burner 122 (shown in FIG. 8a) past the heat transfer pins. Heat transfer pins may also be disposed on the interior surface (not shown) of heater head 330. Interior-facing heat transfer pins serve to provide a large surface area for the transfer of heat by conduction from heater head 330 to the working fluid.

The use and method of manufacture of heat transfer pins is described in copending U.S. patent application No. 09/517,123, attorney docket number 2229/105, titled "Stirling Engine Thermal System Improvements", incorporated by reference above.

Depending on the size of heater head 330, hundreds or thousands of inner transfer pins and outer heat transfer pins may be desirable. In accordance with certain embodiments of the invention, individual arrays of pins 150, comprise arcuate fractions of the circumferential distance around the heater head 330. This is apparent in the top view of the heater head assembly shown in perspective in FIG. 8b. Between successive heat transfer pin array segments 150 are trapezoidal dividers 506 which are baffled to block the flow of exhaust gases in a downward direction through any path other than past the heat transfer pins. Since exhaust gases do not flow through dividers 506, a temperature sensor, such as thermocouple 138 is advantageously disposed in divider 506 in order to monitor the temperature of heater head 330 with which the temperature sensor is in thermal contact.

Temperature sensing device 138 is preferably disposed within divider 506 as depicted in FIG. 8b. More particularly, temperature sensing tip 139 of temperature sensor 138 is preferably located in the slot corresponding to divider 506 as nearly as possible to cylinder head 332 in that this area is typically the hottest part of the heater head. Alternatively, temperature sensor 138 might be mounted directly to cylinder head 332, however location of the sensor in the slot, as described, is preferred. Engine performance, in terms of both power and efficiency, is highest at the highest possible temperature, yet the maximum temperature is typically limited by metallurgical properties. Therefore, sensor 138 should be placed to measure the temperature of the hottest, and therefore the limiting, part of the heater head. Additionally, temperature sensor 138 should be insulated from combustion gases and walls of divider 506 by ceramic insulation (not shown). The ceramic can also form an adhesive bond with the walls of the divider to retain the temperature sensor in place. Electrical leads 144 of temperature sensor 138 should also be electrically insulated.

Returning to FIG. 8a, exhaust gases follow path 808 past heater head 330 and are then channeled up along path 810, between chamber liner 806 and inner insulation 812, thereby absorbing additional heat from chamber liner 806, with the additional advantage of preventing overheating of the chamber liner. The exhaust gases are then returned downward through preheater 814 and exhausted around the circumference of heater head 330 as shown by arrows designated 816. Preheater 814 allows for exchange of heat from the exhaust gases to air taken in from the ambient environment, typically by an air pump or blower. Preheater 814 may be fabricated from corrugated folder fins, typically, Inconel, however, any means for exchange of heat from the exhaust to the input air is within the scope of the present invention.

Figure 9A:
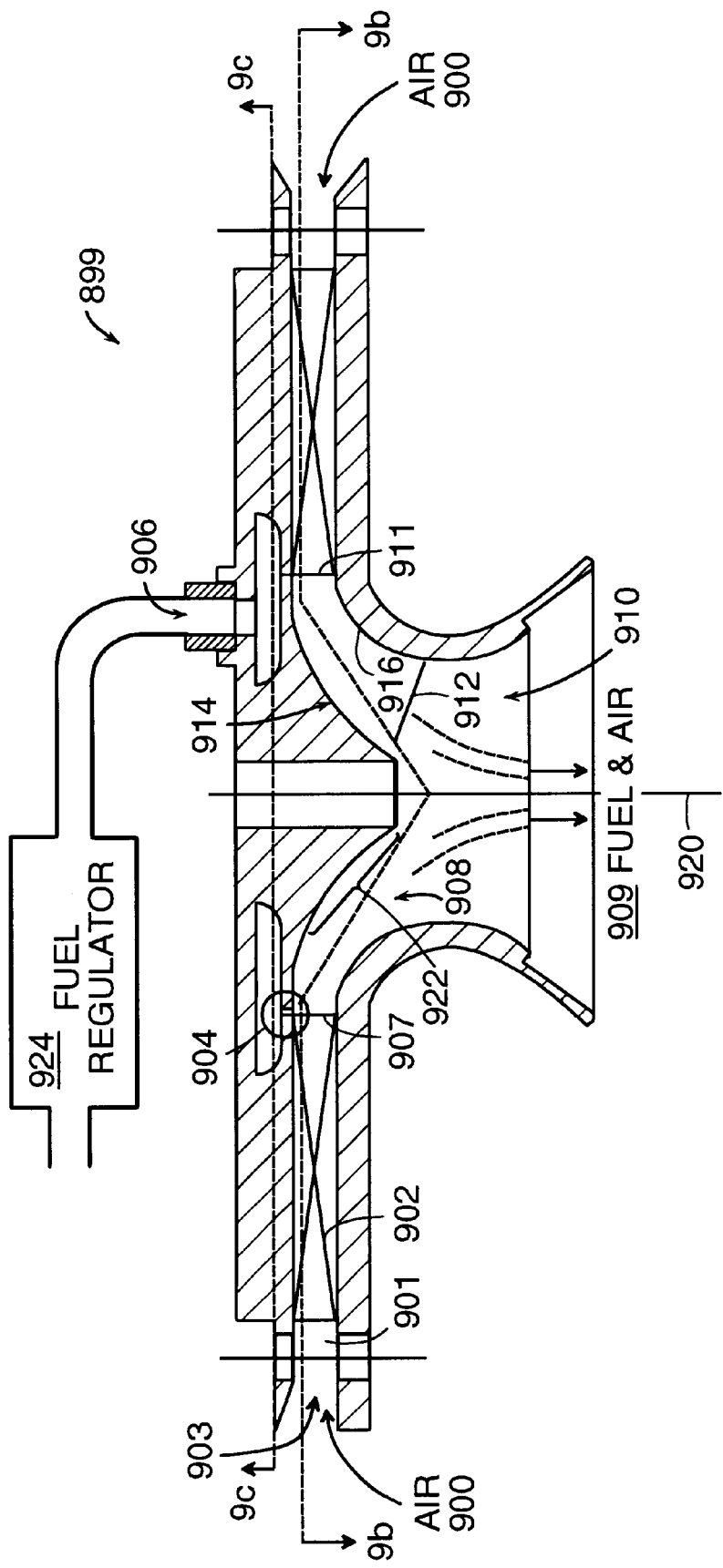
FIG. 9a shows a cross-sectional view from the side of a fuel intake manifold for a Stirling cycle engine in accordance with a preferred embodiment of the invention.
Figure 9B:
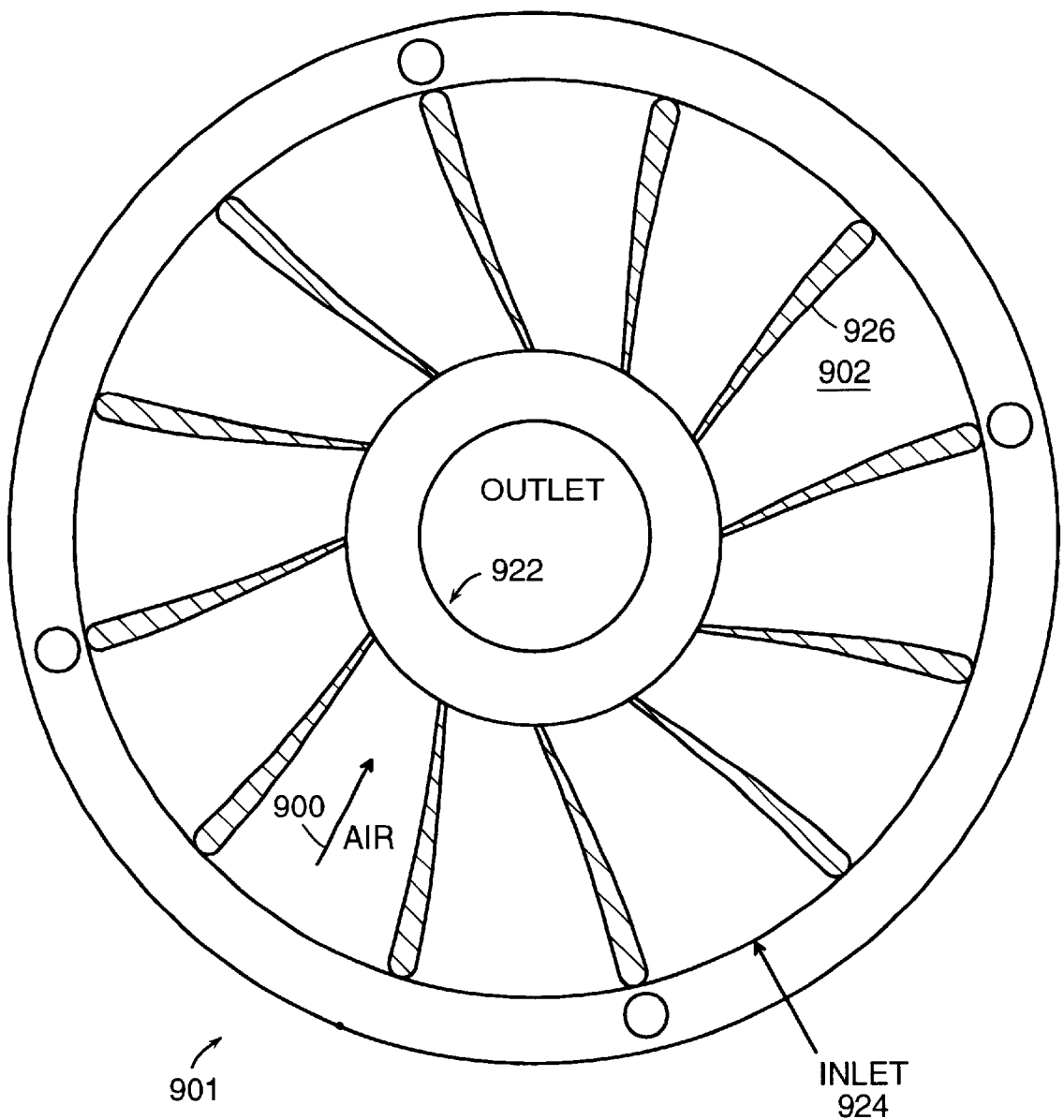
FIG. 9b shows a cross-sectional view from the top of the fuel intake manifold of FIG. 9a taken through cut BB.
Figure 9C:
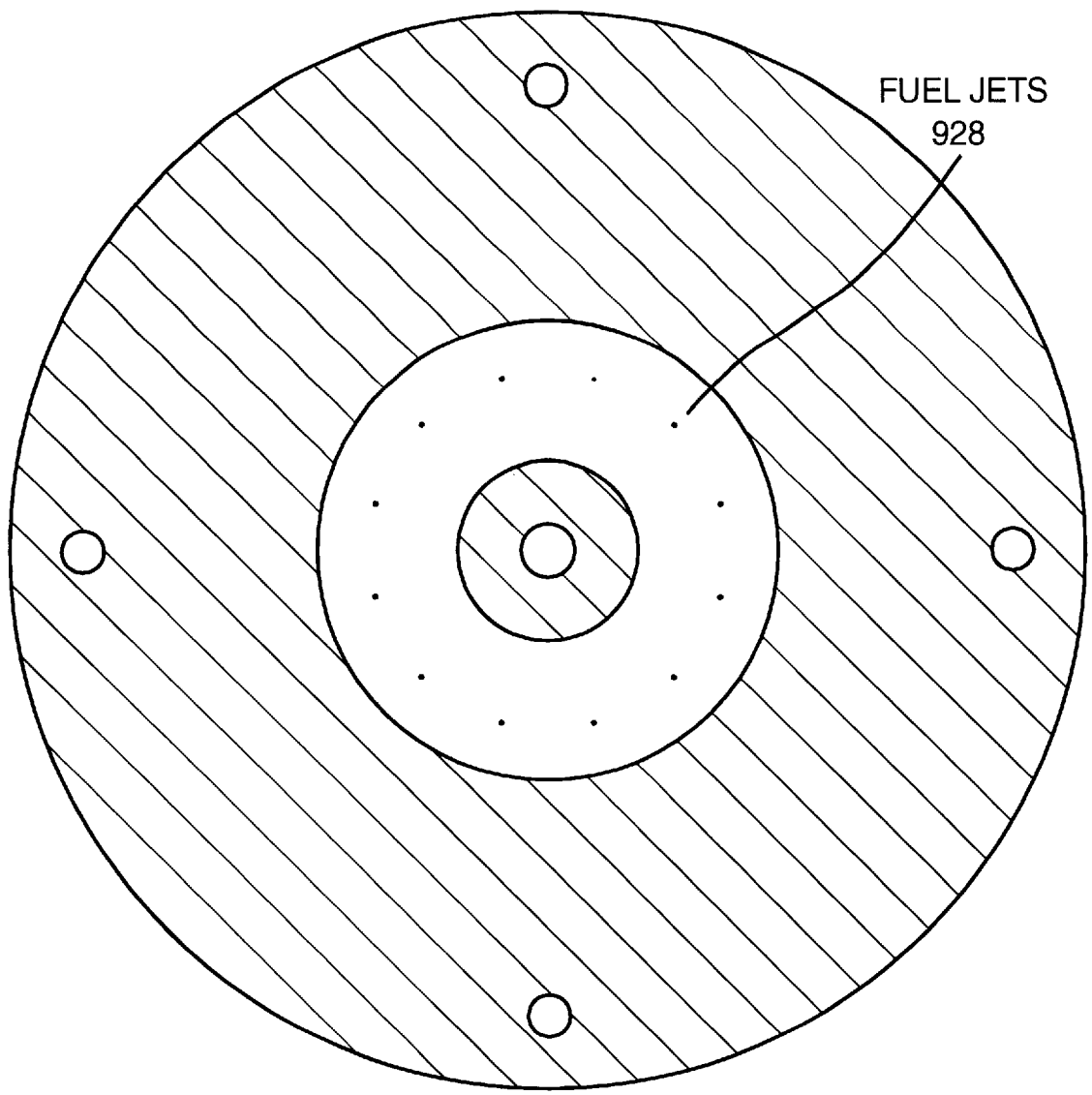
FIG. 9c is a cross-sectional view from the top of the fuel intake manifold of FIG. 9a taken through cut AA, showing the fuel jet nozzles.

Referring now to FIGS. 9a–9c, an intake manifold 899 is shown for application to a Stirling cycle engine or other combustion application in accordance with an embodiment of the invention. In accordance with a preferred embodiment of the invention, fuel is pre-mixed with air that may be heated above the fuels auto-ignition temperature and a flame is prevented from forming until the fuel and air are well mixed. FIG. 9a shows a preferred embodiment of the apparatus including an intake manifold 899 and a combustion chamber 910. The intake manifold 899 has an axisymmetrical conduit 901 with an inlet 903 for receiving air 900. Air 900 is pre-heated to a temperature, typically above 900 K, which may be above the auto-ignition temperature of the fuel. Conduit 901 conveys air 900 flowing inward radially with respect to combustion axis 920 to a swirler 902 disposed within the conduit 901.

FIG. 9b shows a cross sectional view of the conduit 901 including swirler 902 in accordance with an embodiment of the invention. In the embodiment of FIG. 9b, swirler 902 has several spiral-shaped vanes 926 for directing the flow of air 900 radially inward and imparting a rotational component on the air. The diameter of the swirler section of the conduit decreases from the inlet 924 to the outlet 922 of swirler 902 as defined by the length of the swirler section conduit 901. The decrease in diameter of swirler vanes 926 increases the flow rate of air 900 in substantially inverse proportion to the diameter. The flow rate is increased so that it is above the flame speed of the fuel. At outlet 922 of swirler 902, fuel 906, which in a preferred embodiment is propane, is injected into the inwardly flowing air.

In a preferred embodiment, fuel 906 is injected by fuel injector 904 through a series of nozzles 928 as shown in FIG. 9c. More particularly, FIG. 9c shows a cross sectional view of conduit 901 and includes the fuel jet nozzles 928. Each of the nozzles 928 is positioned at the exit of the swirler vanes 926 and is centralized between two adjacent vanes. Nozzles 928 are positioned in this way for increasing the efficiency of mixing the air and fuel. Nozzles 928 simultaneously inject the fuel 906 across the air flow 900. Since the air flow is faster than the flame speed, a flame will not form at that point even though the temperature of the air and fuel mixture is above the fuel's auto-ignition temperature. In a preferred embodiment, where propane is used, the preheat temperature, as governed by the temperature of the heater head, is approximately 900 K.

Referring again to FIG. 9a, the air and fuel, now mixed, referred to hereafter as "air-fuel mixture" 909, is transitioned in direction through a throat 908 which has a contoured fairing 930 and is attached to the outlet 907 of the conduit 901. Fuel 906 is supplied via fuel regulator 932. Throat 908 has an inner radius 914 and an outer dimension 916. The transition of the air-fuel mixture is from a direction which is substantially transverse and radially inward with respect to combustion axis 920 to a direction which is substantially parallel to the combustion axis. The contour of the fairing 930 of throat 908 has the shape of an inverted bell such that the cross sectional area of throat 908 with respect to the combustion axis remains constant from the inlet 911 of the throat to outlet 912 of the throat. The contour is smooth without steps and maintains the flow speed from the outlet of the swirler to the outlet of the throat 908 to avoid separation and the resulting recirculation along any of the surfaces. The constant cross sectional area allows the air and fuel to continue to mix without decreasing the flow speed and causing a pressure drop. A smooth and constant cross section produces an efficient swirler, where swirler efficiency refers to the fraction of static pressure drop across the swirler that is converted to swirling flow dynamic pressure. Swirl efficiencies of better than 80% may typically be achieved by practice of the invention. Thus, the parasitic power drain of the combustion air fan may be minimized.

Outlet 912 of the throat flares outward allowing the air-fuel mixture 909 to disperse into the chamber 910 slowing the air-fuel mixture 909 thereby localizing and containing the flame and causing a toroidal flame to form. The rotational momentum generated by the swirler 902 produces a flame stabilizing ring vortex as well known in the art. The operation of the fuel intake valve as shown in FIGS. 9a–9c is further described in pending U.S. patent application No. 09/116,383, filed Jul. 14, 1998, which is herein incorporated by reference.

In order to safely operate a burner, it is important to be able to sense or detect the presence of the flame. If the flame is extinguished, the flame should be relit or the fuel supply to the burner be shut off within a few seconds. Otherwise, the burner and APU may fill up with a flammable mixture, which if ignited would produce a fire or explosion. Several types of flame sensors are used in the art such as thermocouples, flame rectification, infrared ("IR") and ultraviolet ("UV") detectors.

In a preferred embodiment, where the fuel is propane, the high temperature of the preheated air and propane fuel mixture prevents the use of several standard flame sensing strategies. A standard single thermocouple flame sensor will not be able to accurately detect a flame because the flame-on temperature varies with the preheated air temperature. In addition, the preheated air temperature is often greater than the flame-on temperature for most thermocouple flame detectors. An IR sensor may not be able to distinguish between the hot ceramic interior of the combustion chamber of the burner and a flame. IR and UV sensors present additional difficulties as they are relatively large in size compared to the burner and require an optical path to the combustion chamber. In the lean burning conditions of a preferred embodiment, flame rectification may not reliably detect a flame-on or flame-out event.

Figure 10:
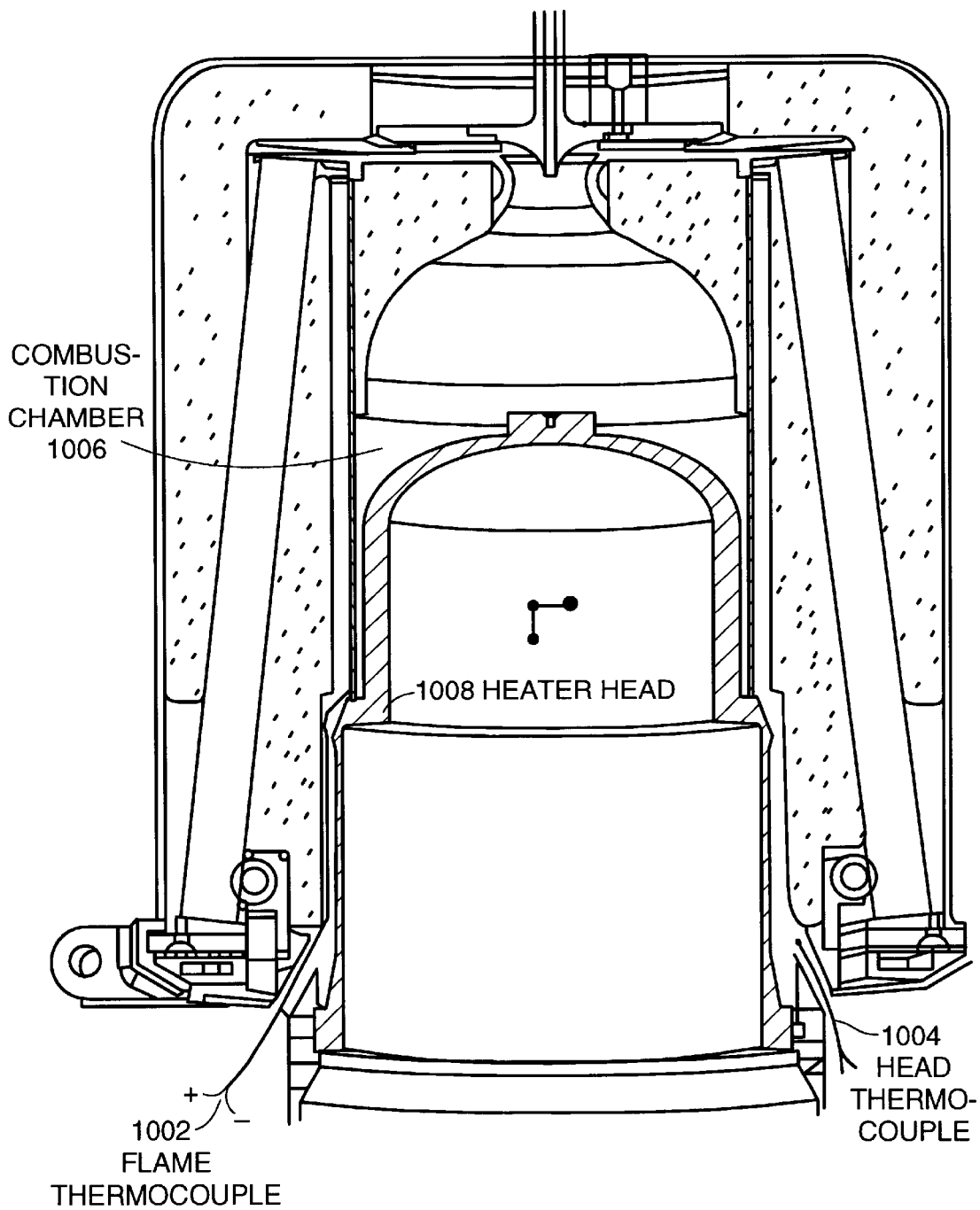
FIG. 10 is a cross section of the burner and heater head assembly showing the placement of a flame detection thermocouple in accordance with an embodiment of the invention.
Figure 11:
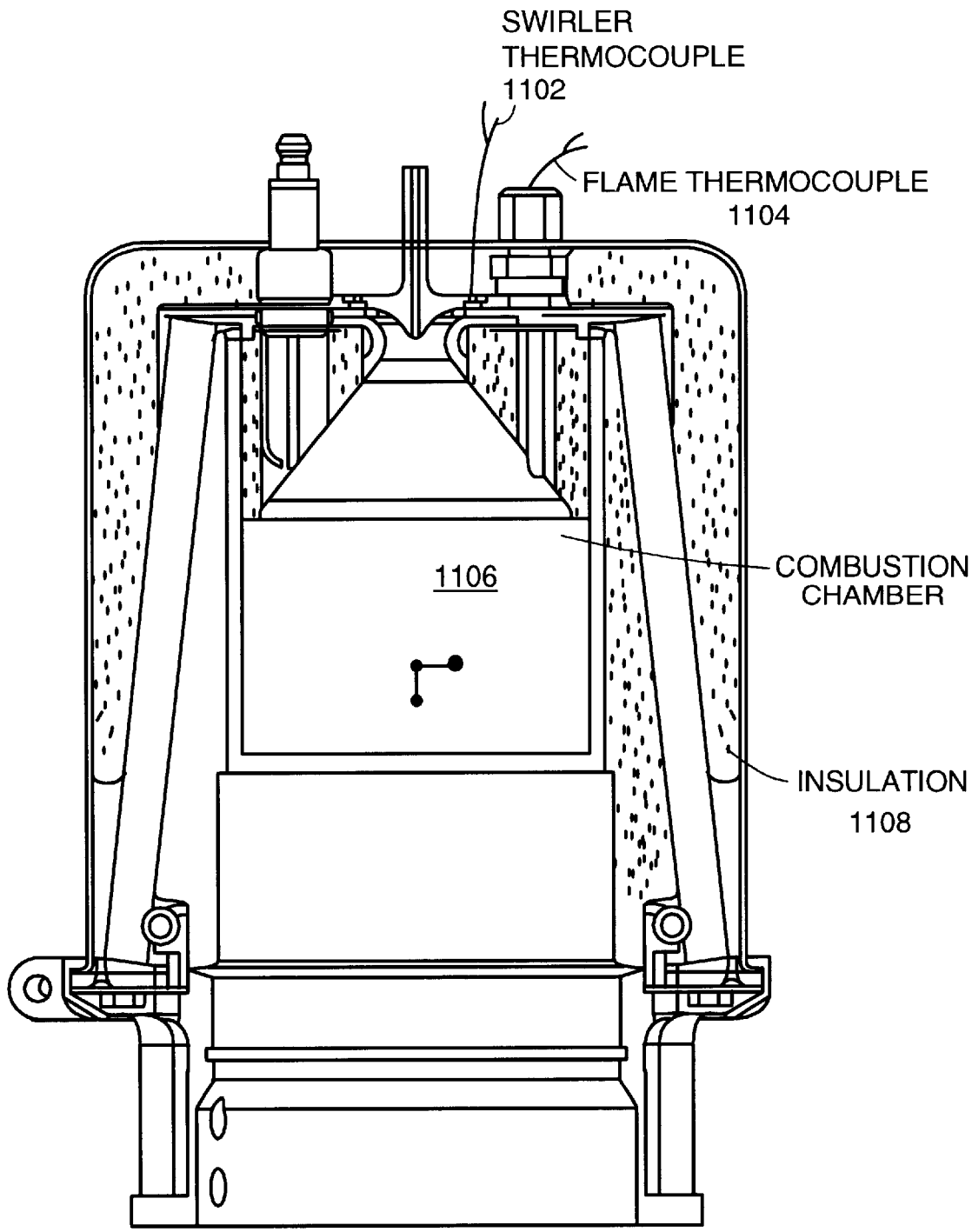
FIG. 11 is a cross section of the burner and heater head assembly showing the placement of a flame detection thermocouple in accordance with an alternative embodiment of the invention.

FIGS. 10 and 11 illustrate methods of reliably detecting a flame in a combustion chamber of a burner in accordance with embodiments of the invention. In FIG. 10, a flame detector thermocouple 1002 is mounted in the Stirling heater head 1008 so that it extends from the top of the heater head 1008 far enough to measure the temperature of the combustion gases. The flame detector thermocouple 1002 must also be mounted in a position so that it does not exceed its operating temperature. A flame is considered present if the flame thermocouple temperature is significantly greater than the average measured heater head temperature. The average heater head temperature is measured using a head thermocouple 1004. In the presence of a flame, the flame thermocouple will become much hotter than the sensors used to measure the heater head temperature. If the flame goes out, the flame thermocouple temperature will rapidly approach the heater head temperature. In a preferred embodiment, the flame thermocouple extends 2 mm above the heater head and proves the presence of a flame if the temperature difference between the flame detector thermocouple 1002 and the head thermocouple 1004 is 100° C.

In a alternative embodiment, as shown in FIG. 11, a flame thermocouple 1104 is mounted in the Stirling burner extending through the combustion chamber liner 1108 to the edge of the combustion chamber 1106 as shown in FIG. 11. The flame thermocouple 1104 should not extend so far that it exceeds it operating temperature. A flame is considered present if the flame thermocouple temperature is significantly greater than the measured heater head temperature. The heater head temperature may be measured using a head thermocouple 1004 as shown in FIG. 10. In a preferred embodiment, the flame thermocouple extends to the edge of the combustion chamber and proves the presence of a flame if the temperature difference between the flame thermocouple 1104 and the head thermocouple 1004 is 100° C.

In an a further embodiment, as shown in FIG. 11, the temperature of the flame thermocouple 1104 is compared to the measured swirler temperature. A flame is considered present if the flame thermocouple temperature is significantly greater than the measured swirler temperature. The swirler temperature is measured using a swirler thermocouple 1102. In a preferred embodiment, the flame thermocouple extends to the edge of the combustion chamber and proves the presence of a flame if the temperature difference between the flame thermocouple 1104 and the swirler thermocouple 1102 is 100° C.

In yet another embodiment, a flame thermocouple is mounted on either the heater head or in the combustion chamber as shown in FIGS. 10 and 11. Transitions in the flame are detected by monitoring the time rate of change of the flame thermocouple temperature (dT/dt). Flame ignition will produce a positive change in the flame thermocouple temperature. Extinguishing the flame or having a flame-out condition will produce a negative change in the flame thermocouple temperature. During the ignition procedure, the flame is considered not lit, until the change in the flame thermocouple temperature exceeds a predefined threshold value in ° C./sec. Thereafter, the flame is considered lit until the change in flame thermocouple temperature drops below a negative threshold value in -° C./sec. In a preferred embodiment, the flame-on threshold temperature rate is 3° C./sec and the flame-out threshold temperature rate is -2° C./sec.

Figure 12:
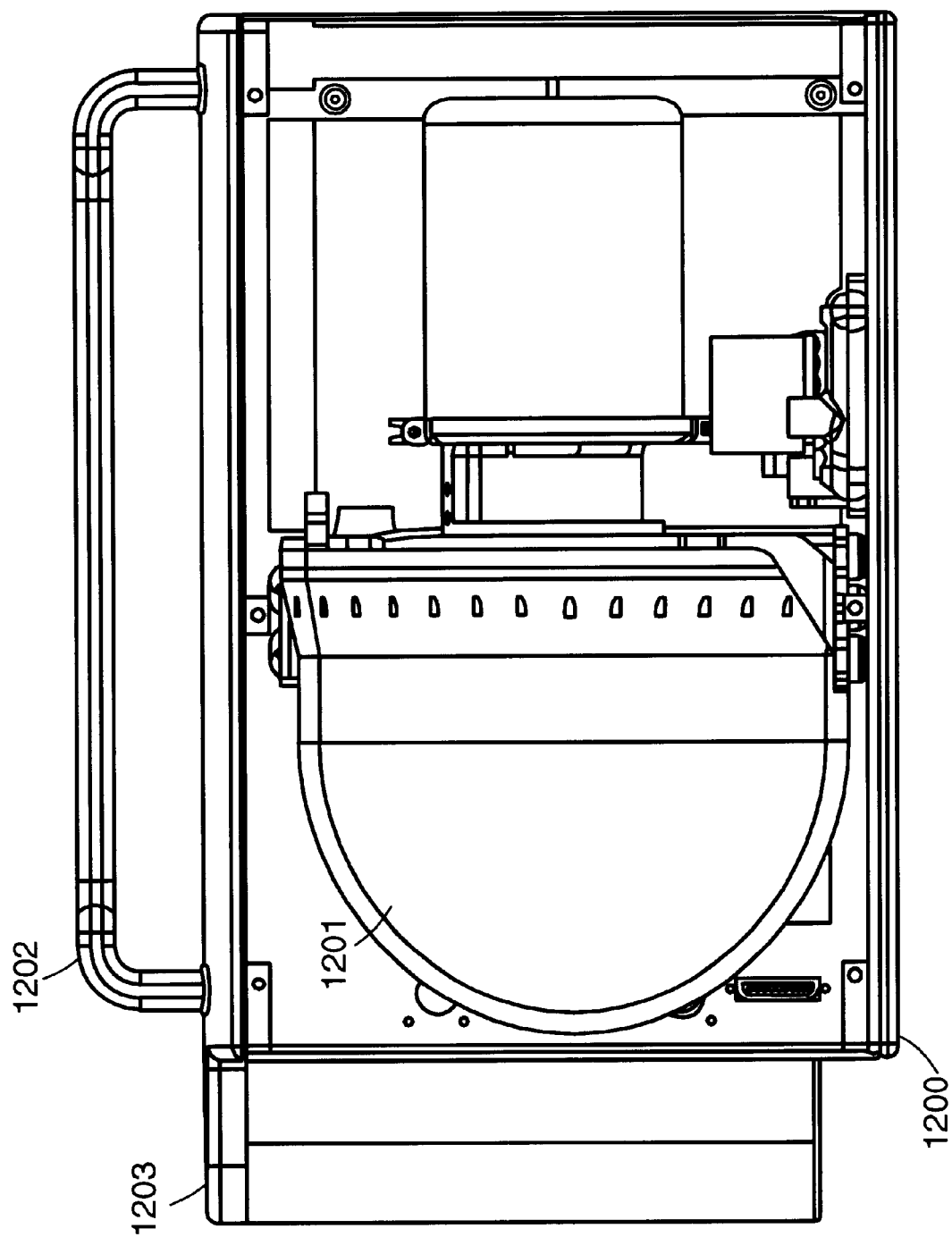
FIG. 12 is a front view of an APU where the front panel of the enclosure has been removed for interior viewing in accordance with an embodiment of the invention.
Figure 13:
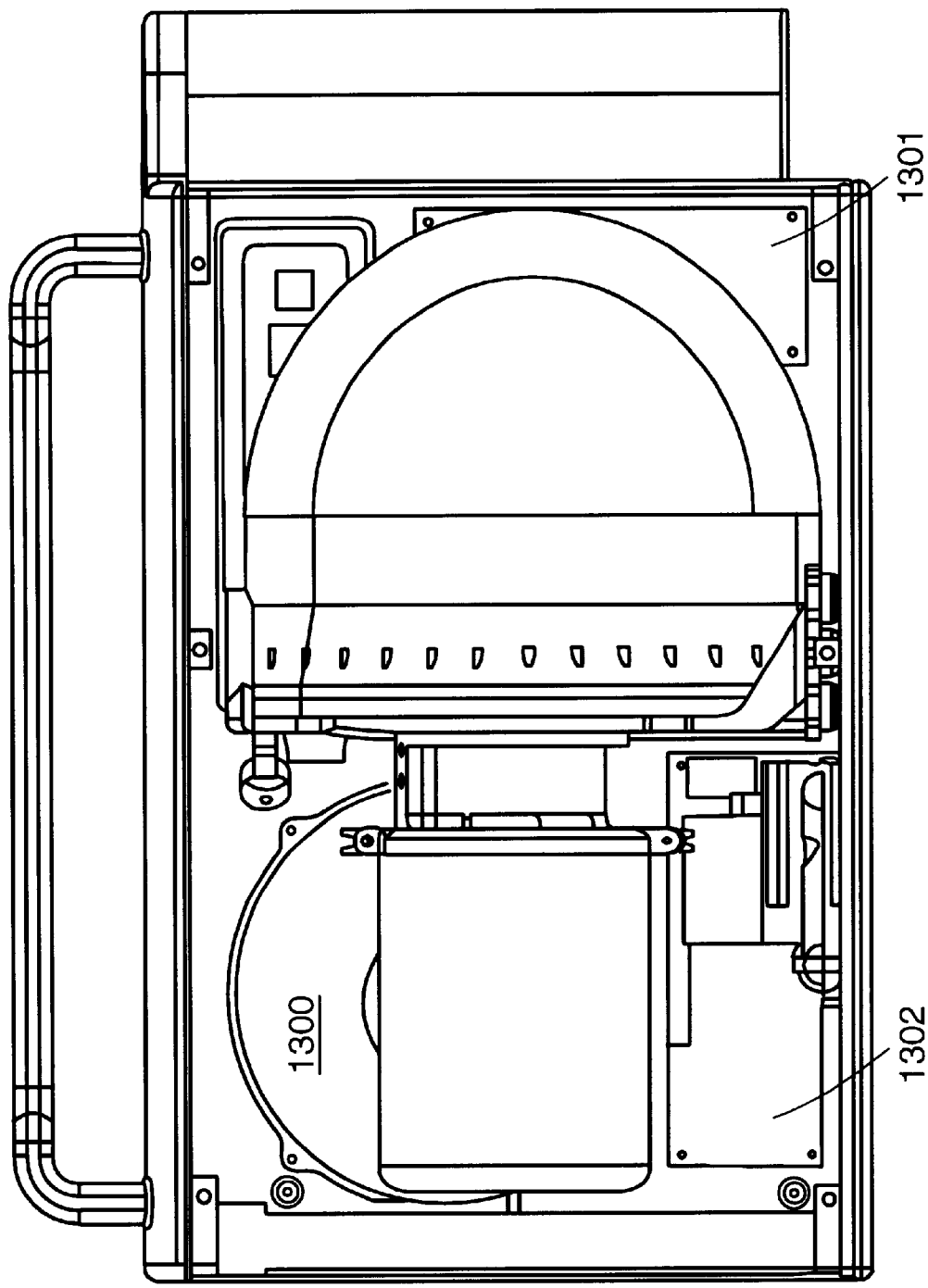
FIG. 13 is a back view of the embodiment of FIG. 12 in accordance with an embodiment of the invention.

FIG. 12 shows a front view of an APU where the front panel of the enclosure 1200 has been removed for interior viewing. The Stirling engine (not shown) and generator (not shown) are enclosed in a pressure vessel 1201. A handle 1202 is attached to the enclosure for ease of portability. As discussed above with respect to FIG. 1, the APU is advantageously of a portable size. In an alternative embodiment, the APU may be placed in a window or mounted on the wall of a room in a building. A fuel canister holder 1203 is attached to the enclosure 1200 and holds the fuel canister. The fuel canister is mounted to the exterior of the enclosure 1200 for ease of replacement. The pressure vessel 1201 is mounted to the enclosure 1200 via vibration mounts in order to reduce vibration and noise. FIG. 13 shows the back view of the embodiment shown in FIG. 12 and the location of a blower 1300, the power control circuitry 1301 and the burner control circuitry 1302.

Figure 14:
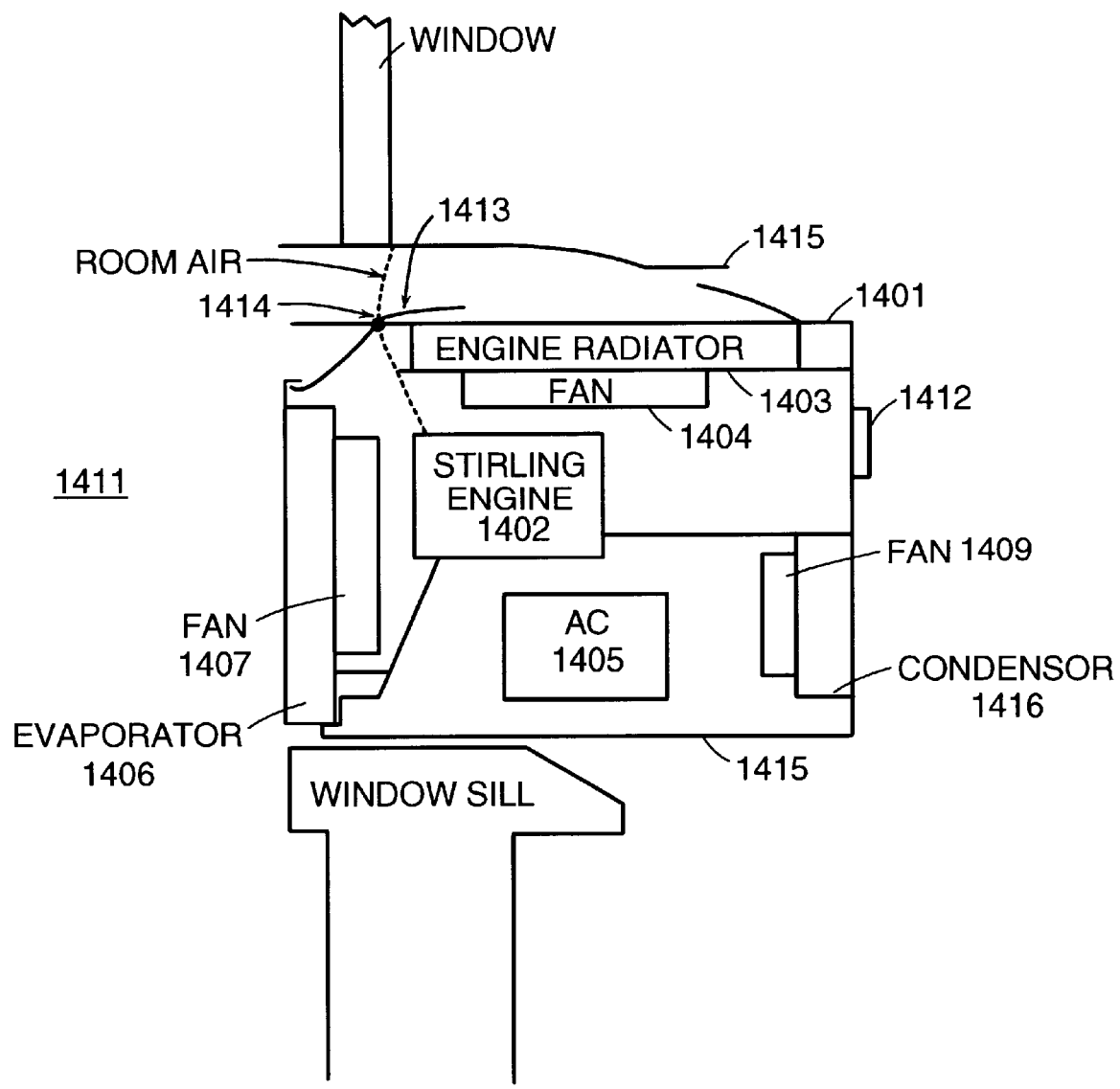
FIG. 14 is a schematic block diagram of an auxiliary power unit and air conditioning system in accordance with an embodiment of the invention.

In an alternative embodiment, the APU may be configured to mount in a window to provide power and air conditioning as shown in FIG. 14. During colder months the APU draws room air past vent 1413 in the solid line position, through engine radiator 1403 and returns the heated air to the room through an evaporator radiator 1406, thus, providing forced-air heating to the room 1411 as well as electric power. The amount of heating provided is controlled through a vent 1412 which varies the amount of heated air returned to the room versus exhausted to the outside. During moderately warm months, the APU draws room air through the engine radiator 1403 and exhausts all of the air outside through the vent 1412, thus, cooling the house by creating a breeze of fresh air. The APU also produces electric power. In the hottest months, a portion of the mechanical power of the Stirling engine/generator 1402 is used to power an air conditioner 1405, which cools the room by drawing the room air past vent 1413 in the dashed line position and through evaporator heat exchanger 1406 using a fan 1407. Vent 1413 rotates about a pin 1414 to move between two positions as shown in FIG. 14 as solid and dashed lines. The engine radiator fan 1404 reverses direction from the previous description to draw outside air in past vent 1412, through the engine radiator 1403 and exhausts the air through a flap vent 1415 to the outside. The air conditioner 1405 draws in additional air through a condenser radiator 1416 and vents it back outside. In the air conditioning mode, less electrical power is available to a user.

The air conditioner may be one of three embodiments, all well known to one of ordinary skill in the refrigeration art. In a preferred embodiment, a vapor compression unit is used that is readily available in a suitable size for a one room cooler. In an alternative embodiment, an ammonia/water cooler is used which draws less electrical power thereby providing more electrical power to the users for lights, etc. In another embodiment, a duplex Stirling engine may be used that has an additional set of pistons that provide cooling to a fluid pumped through the evaporator radiator 1406. The duplex Stirling engine would reject heat to the condenser radiator 1408.

Figure 15:
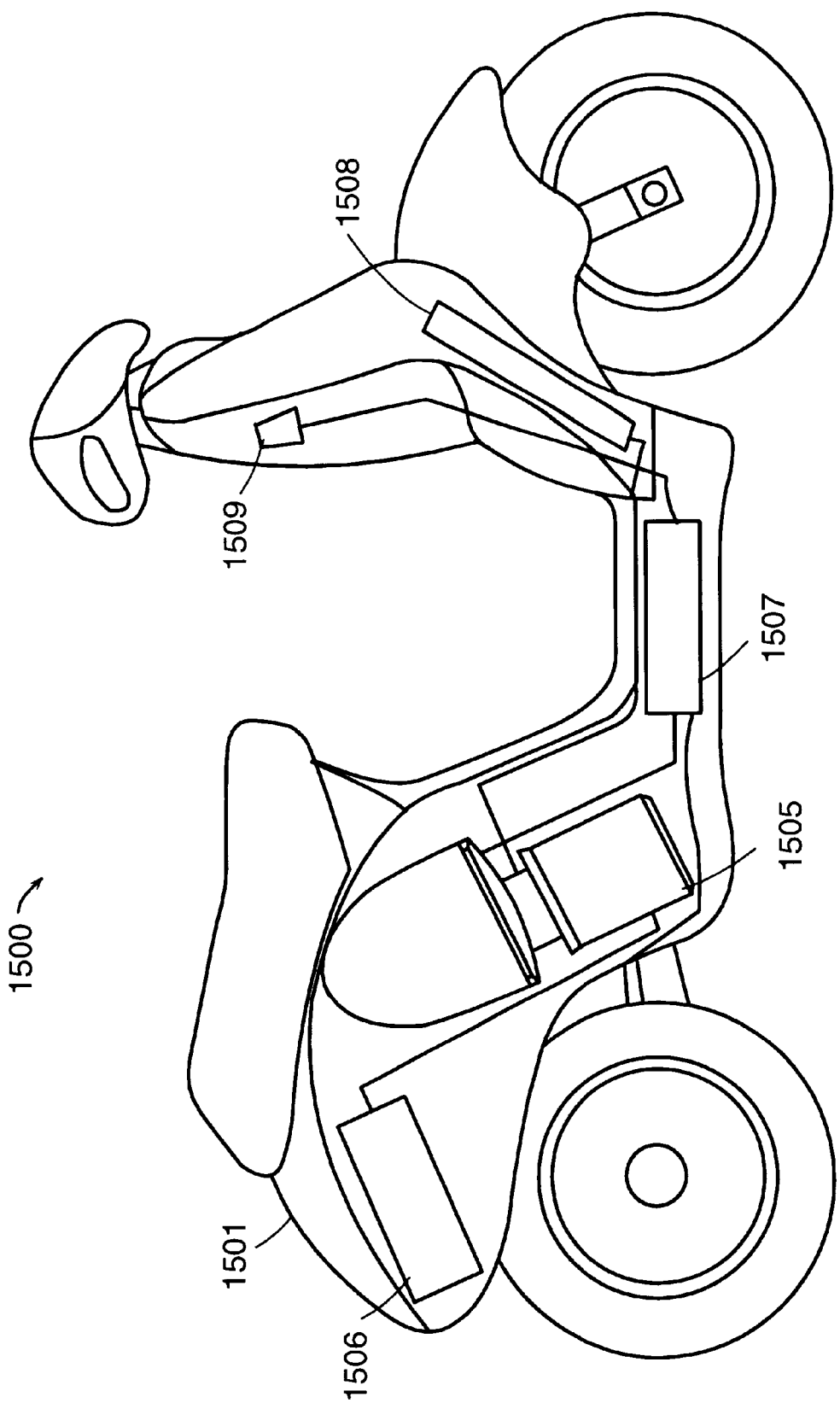
FIG. 15 is a schematic diagram of a scooter utilizing the auxiliary power unit in accordance with an embodiment of the invention.

FIG. 15 illustrates a personal transport vehicle utilizing an APU as described above in accordance with an embodiment of the invention. The compact size and electrical output of the APU may provide personal transport by incorporating the APU into a motorized scooter as shown in FIG. 15. The APU/scooter designated generally by 1500 has a body covering 1501 covering the APU components and a wheel motor (not shown). A Stirling engine 1505 is mounted to the scooter and connected to a fuel supply 1506 and a radiator 1508. The electrical output of the Stirling engine is stored in a battery stack 1507. An electrical outlet 1509 is optionally connected to the battery stack 1507 to provide electricity when the scooter is not being used for transportation. The battery stack 1507 is connected to the scooter wheel motor to power the motor when the scooter is being used for transportation.

The described embodiments of the invention are intended to be merely exemplary and numerous variations and modifications will be apparent to those skilled in the art. All such variations and modifications are intended to be within the scope of the present invention as defined in the appended claims.

We claim:

1. An auxiliary power system for providing electrical power and heat to an indoor area, the system comprising:
   an external combustion engine for generating mechanical energy and thermal energy, the external combustion engine burning a fuel and having substantially complete combustion such that exhaust emissions from the external combustion engine are below a predetermined exhaust level;
   a generator, coupled to the external combustion engine, the generator for converting the mechanical energy of the external combustion engine to electrical power;
   a first power output for providing electrical power;
   a housing containing the external combustion engine and the generator, such that the external combustion engine, generator and housing combination is a portable size;
   a battery coupled to the generator and the first power output, the battery for providing starting power for the external combustion engine and for providing power to the first power output; and
   a sensor coupled to the battery and producing an output signal wherein the charge level of battery is determined based in part on the sensor output signal;
   wherein the thermal energy generated by the external combustion engine heats the atmosphere in the indoor area surrounding the housing.

2. A system according to claim 1, wherein the output signal is a signal representing the battery voltage and current.

3. An auxiliary power system for providing electrical power and heat to an indoor areas, the system comprising:
   a Stirling cycle engine having a crankshaft and a combustion chamber, the Stirling cycle engine for generating mechanical energy and thermal energy, the Stirling cycle engine burning a fuel and having substantially complete combustion such that exhaust emissions of the Stirling cycle engine are below a predetermined exhaust level;
   a first power output for providing electrical energy;
   a generator coupled to the crankshaft of the Stirling cycle engine and the first power output, the generator for converting the mechanical energy of the Stirling cycle engine to electrical energy;
   a battery coupled to the generator, the battery for providing starting power for the Stirling cycle engine and for providing power to the first power output; and
   a housing containing the Stirling cycle engine, the generator, and the battery such that the Stirling cycle engine, generator battery and housing combination is a portable size.

4. An auxiliary power system according to claim 3, wherein the housing may be mounted in a window, the system further including an air conditioning module, coupled to the Stirling cycle engine, the air conditioning module for cooling the atmosphere surrounding the housing.

5. An auxiliary power system according to claim 3, wherein the fuel is propane.

6. An auxiliary power system according to claim 3, wherein the electrical power is direct current power.

7. An auxiliary power system according to claim 3, wherein the housing may be mounted in a window or on a wall in a room of a building.

8. A system for controlling the power output of a thermal engine having a heater head, the system comprising:
   a. a burner for delivering heat to the heater head of the engine, the burner having an exhaust gas product;
   b. an input for receiving a signal related to a specified temperature of operation of the burner;
   c. a fuel supply regulator for delivering fuel to the burner at a specified rate of fuel delivery;
   d. a blower for delivering air to the burner;
   e. a sensor for monitoring an oxygen concentration in the exhaust gas product of the burner; and
   f. a controller for governing the rate of fuel and air delivery based at least on the input related to the specified temperature of operation and the oxygen concentration in the exhaust gas product.

9. A system according to claim 8, wherein the input for receiving a signal further includes a slow rate limiter.

10. A system for controlling the power output of an external combustion engine, the external combustion engine having a crankshaft and a speed, the system comprising:
    a generator, coupled to the crankshaft of the external combustion engine, the generator for regulating the speed of the external combustion engine;
    an amplifier coupled to the generator, the amplifier for transferring power from the generator to a power output and providing a load on the generator; and
    a battery coupled to the generator, the battery for storing power and providing power to the power output;
    wherein the speed and a temperature of the external combustion engine are controlled in a manner to maintain a set of desired battery conditions.

11. A system according to claim 10, wherein the external combustion engine is a Stirling cycle engine.

12. A system according to claim 10, wherein the generator is a permanent magnet brushless motor.

13. A system according to claim 10, wherein the desired battery condition is a constant battery charge.

14. A system according to claim 13, wherein the constant battery charge is 90% of full charge.

15. A system according to claim 13, wherein the constant battery charge is in the range of 80–100% of full charge.

16. A system according to claim 10, further including:
    a radiator thermally coupled to the external combustion engine, the radiator containing a fluid for the absorption of excess heat; and
    a set of shunt resistors coupled to the generator and the amplifier, the set of shunt resistors contained within the liquid of the radiator, the set of shunt resistors for dissipating excess power produced by the external combustion engine.

17. A method for controlling the power output of an external combustion engine, the external combustion engine having a crankshaft and a speed, the method comprising:

regulating the speed of the external combustion engine using a generator coupled to the crankshaft of the external combustion engine;

transferring power from the generator to a power output using an amplifier coupled to the generator;

providing a load on the generator using the amplifier;

storing power in a battery, the battery providing power to the power output; and controlling the speed and a temperature of the external combustion engine in a manner to maintain a set of desired battery conditions.

18. A method according to claim 17, wherein the external combustion engine is a Stirling cycle engine.

19. A method according to claim 17, wherein the generator is a permanent magnet brushless motor.

20. A method according to claim 17, wherein the desired battery charge is a constant battery charge.

21. A method according to claim 20, wherein the constant battery charge is 90% full charge.

22. A method according to claim 20, wherein the constant battery charge is in the range of 80–100% of full charge.

23. A system for controlling the power output of a thermal engine having a heater head, the system comprising:
 a. a burner for delivering heat to the heater head of the engine, the burner having an exhaust gas product;
 b. a fuel supply regulator for delivering fuel to the burner at a specified rate of fuel delivery;
 c. a blower for delivering air to the burner;
 d. a head temperature sensor for measuring the temperature of the heater head;
 e. a sensor for monitoring an oxygen concentration in the exhaust gas product of the burner; and
 f. a controller for governing the rate of fuel and air delivery based at least on the temperature of the heater head and the oxygen concentration in the exhaust gas product.

24. A system according to claim 23, wherein the heater head includes a region of an exterior surface shadowed from flow of the exhaust gas.

25. A system according to claim 24, wherein the head temperature sensor is disposed in the region of an exterior surface shadowed from flow of the exhaust gas.

26. A system for controlling the power output of a thermal engine having a heater head, the system comprising:
 a. a burner for delivering heat to the heater head of the engine, the burner having an exhaust gas product;
 b. a fuel supply regulator for delivering fuel to the burner at a specified rate of fuel delivery;
 c. a blower for delivering air to the burner;
 d. a head temperature sensor for measuring the temperature of the heater head;
 e. an air mass flow sensor for measuring the mass of air delivered to the burner; and
 e. a controller for governing the rate of fuel and air delivery based at least on the temperature of the heater head and the mass of air delivered to the burner.

27. A system for controlling the power output of a thermal engine having a heater head, the system comprising:
 a. a burner for delivering heat to the heater head of the engine, the burner having an exhaust gas product and characterized by a combustion axis;
 b. a fuel supply regulator for delivering fuel to the burner at a specified rate of fuel delivery;
 c. a blower for delivering air to the burner;
 d. a swirler having axial symmetry about the combustion axis for conveying radially inwardly flowing air;
 e. a head temperature sensor for measuring the temperature of the heater head;
 f. a swirler temperature sensor for measuring the temperature of air delivered to the burner; and
 e. a controller for governing the rate of fuel and air delivery based at least on the temperature of the heater head and the temperature of air delivered to the burner.

28. An auxiliary power system for providing electrical power to a load, the system comprising:
 (a) an external combustion engine having a rotating crankshaft characterized by a velocity, the engine characterized by an engine temperature;
 (b) a generator coupled to the rotating crankshaft, the generator regulating the velocity of the crankshaft and producing electrical power;
 (c) an amplifier coupled to the generator, the amplifier transferring electrical power from the generator to the load;
 (d) a battery characterized by a charge state, the battery coupled to the amplifier, the battery capable of storing electrical power from the amplifier and capable of transferring electrical power to the load; and
 (e) a controller in signal communication with the engine, amplifier, and battery, the controller commanding the engine temperature and the velocity based in part on the charge state of the battery.

29. A system for providing power to a personal transport vehicle having a set of wheels including at least one member and a wheel motor coupled to the set of wheels for causing, when powered, locomotion of the personal transport vehicle, the system comprising:

an external combustion engine for generating mechanical energy and thermal energy, the external combustion engine burning a fuel in a burner and having substantially complete combustion such that the exhaust emissions from the external combustion engine are below a predetermined exhaust level;

a fuel supply, coupled to the burner of the external combustion engine, the fuel supply for providing a fuel to the burner at a specified rate of fuel delivery;

a generator coupled to the external combustion engine, the generator for converting the mechanical energy produced by the external combustion engine to electrical power;

a battery having an input and an output, the battery input coupled to the generator and the battery output coupled to the wheel motor, the battery for storing electrical energy provided from the generator at the battery input and for providing power to the wheel motor at the battery output; and a radiator thermally coupled to the external combustion engine, the radiator containing a fluid for the absorption of excess thermal energy.

30. A mobile auxiliary power unit comprising:

an external combustion engine having a crankshaft characterized by a velocity and a heater head characterized by a head temperature, the external combustion engine for generating mechanical energy and thermal energy, the external combustion engine burning a fuel and having substantially complete combustion such that exhaust emissions from the external combustion engine are below a predetermined exhaust level;

a generator having an output, the generator coupled to the crankshaft of the external combustion engine and for converting the mechanical energy produced by the external combustion engine into electrical power provided to the output of the generator;

a battery having a battery output and coupled to the output of the generator, the battery characterized by a state of charge and providing starting power to the external combustion and providing power to the battery output;

a controller in signal communication with the external combustion engine, the generator and the battery, the controller governing the velocity of the crankshaft and the temperature of the heater head based at least on the state of charge of the battery; and a wheel motor coupled to the battery output and coupled to a set of wheels, including at least on member such that the wheel motor, when powered by the battery, drives the set of wheels causing the locomotion of the mobile auxiliary power unit.

31. A mobile auxiliary power unit according to claim 30, further including a platform coupled to the set of wheels, the platform for supporting a user.

32. A mobile auxiliary power unit according to claim 30, wherein the external combustion engine is a Stirling cycle engine.

* * * * *

UNITED STATES PATENT AND TRADEMARK OFFICE
CERTIFICATE OF CORRECTION

PATENT NO.     : 6,536,207 B1
DATED          : March 25, 2003
INVENTOR(S)    : Dean L. Kamen et al.

It is certified that error appears in the above-identified patent and that said Letters Patent is hereby corrected as shown below:

<u>Column 26,</u>
Line 2, replace "on" with -- one --.

Signed and Sealed this

Sixth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,536,207 B1
DATED : March 25, 2003
INVENTOR(S) : Dean L. Kamen et al.

It is certified that error appears in the above-identified patent and that said Letters Patent is hereby corrected as shown below:

Column 7,
Line 51, replace "09/517,123" with -- 09/517,245 --.

Column 16,
Line 53, replace "09/517,123" with -- 09/517,245 --.

Column 22,
Line 30, replace "slow" with -- slew --.

Signed and Sealed this

Tenth Day of June, 2003

JAMES E. ROGAN
*Director of the United States Patent and Trademark Office*